US011881371B2

United States Patent
(12) United States Patent
Gershman et al.
(10) Patent No.: US 11,881,371 B2
(45) Date of Patent: Jan. 23, 2024

(54) THERMAL FUSE

(71) Applicant: Solaredge Technologies Ltd., Herzeliya (IL)

(72) Inventors: Israel Gershman, Yehud (IL); Yoav Galin, Raanana (IL); David Lachmann, Mevaseret Zion (IL); Bahat Shafat, Bat Hefer (IL); Matan Zehavi, Magal (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/506,546

(22) Filed: Oct. 20, 2021

(65) Prior Publication Data

US 2022/0122800 A1 Apr. 21, 2022

Related U.S. Application Data

(60) Provisional application No. 63/132,624, filed on Dec. 31, 2020, provisional application No. 63/094,399, filed on Oct. 21, 2020.

(51) Int. Cl.

| | |
|---|---|
| ***H01H 85/055*** | (2006.01) |
| ***H01B 17/58*** | (2006.01) |
| ***H01H 85/06*** | (2006.01) |
| ***H01H 85/08*** | (2006.01) |

(52) U.S. Cl.

CPC ........... *H01H 85/055* (2013.01); *H01B 17/58* (2013.01); *H01H 85/06* (2013.01); *H01H 85/08* (2013.01)

(58) Field of Classification Search

CPC ...... H01B 17/58; H01H 85/055; H01H 85/06; H01H 2085/381; H01H 85/08–12

See application file for complete search history.

(56) References Cited

U.S. PATENT DOCUMENTS

| | | | | |
|---|---|---|---|---|
| 3,201,646 A | | 8/1965 | Mansfield, Jr. | |
| 3,377,448 A | | 4/1968 | Bertram | |
| 3,740,688 A | * | 6/1973 | McIntosh | F23N 5/025 337/414 |
| 4,321,461 A | * | 3/1982 | Walter, Jr | A61M 5/1689 377/53 |
| 4,459,464 A | | 7/1984 | Oda et al. | |
| 5,398,798 A | * | 3/1995 | Ericson | G07F 9/02 194/202 |

(Continued)

FOREIGN PATENT DOCUMENTS

| | | |
|---|---|---|
| CN | 210628229 U | 5/2020 |
| EP | 0423368 A1 | 4/1991 |
| JP | H03216927 A | 9/1991 |

OTHER PUBLICATIONS

Mar. 1, 2022—Extended EP Search Report—EP App. No. 21203719.6.

*Primary Examiner* — Jacob R Crum

(74) *Attorney, Agent, or Firm* — Banner & Witcoff, Ltd.

(57) ABSTRACT

Systems, apparatuses, and methods are described for thermal fuse circuit breakers. The thermal fuses described herein may be disposed in a connector, so that, should an overheating condition occur, for example, due to an arc discharge across or inside of the connector, the heat of the arc discharge melts a portion of the fuse, thereby preventing a potentially catastrophic event, such as fire, or damage to a component which may be more expensive than the thermal fuse itself.

24 Claims, 24 Drawing Sheets

(56) References Cited

U.S. PATENT DOCUMENTS

| | | | | |
|---|---|---|---|---|
| 7,439,844 | B2 * | 10/2008 | Hase | H01H 37/74 337/186 |
| 2002/0114117 | A1 * | 8/2002 | Milanczak | H01H 85/306 361/104 |
| 2008/0129440 | A1 | 6/2008 | Ho | |
| 2009/0009281 | A1 * | 1/2009 | Wang | H01H 85/0418 337/66 |
| 2010/0109833 | A1 * | 5/2010 | Knab | H01H 37/761 337/413 |
| 2012/0068810 | A1 * | 3/2012 | Spalding | H01H 85/157 337/248 |
| 2015/0137934 | A1 * | 5/2015 | Von Zur Muehlen | H01H 85/43 337/273 |
| 2018/0061607 | A1 * | 3/2018 | Schlaak | H01H 85/157 |
| 2018/0131322 | A1 * | 5/2018 | Deceglie | H02S 40/30 |
| 2018/0164364 | A1 * | 6/2018 | Smith | G07C 5/0825 |

* cited by examiner

THERMAL FUSE

RELATED APPLICATIONS

The present application claims the benefit of U.S. Provisional Patent Application No. 63/094,399 filed Oct. 21, 2020 and U.S. Provisional Patent Application No. 63/132,624 filed Dec. 31, 2020, each titled THERMAL FUSE, and each incorporated herein by reference in their entireties for all purposes.

BACKGROUND

A circuit breaker may be inserted into an electrical circuit to protect the electrical circuit from damage caused by an excess current from an overload or from a short circuit. A thermal fuse is a kind of circuit breaker that may be used in temperature sensitive devices in order to cut off (e.g., "break") a circuit in which the thermal fuse is an element. Should the temperature in the thermal fuse overheat, due, for instance, to a fire, a short circuit, an arcing condition, or some other abnormal operation condition, the thermal fuse may cause the circuit to open. Thermal fuses may be single-use devices that include an element that deforms as a consequence of high temperature, rendering the thermal fuse unusable.

SUMMARY

The following summary presents a simplified summary of certain features. The summary is not an extensive overview and is not intended to identify key or critical elements.

Systems, apparatuses, and methods are described for thermal fuse circuit breakers (hereinafter, "thermal fuses", or, in the singular, "thermal fuse"). The thermal fuses described herein may be disposed in an electronic device, such as a connector, so that, following an overheating condition, for example, due to an arc discharge across or inside of the connector, the abnormally high temperature deforms a portion of the fuse, thereby limiting the damage from a potentially catastrophic event, such as fire, or damage to a component which may be more expensive than the thermal fuse itself.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
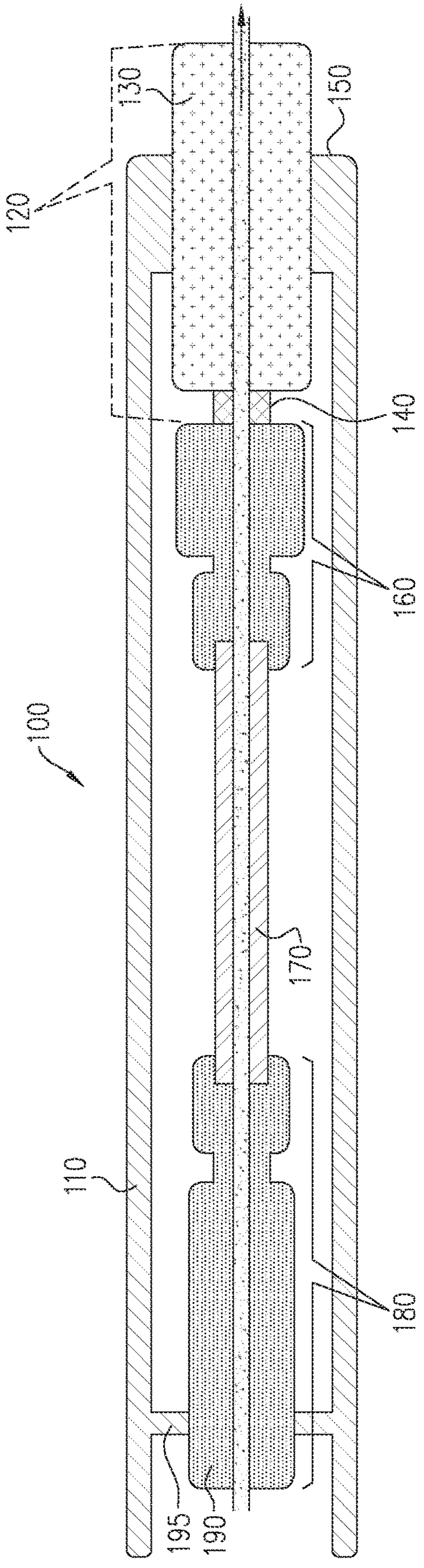
FIG. 1 shows an illustration of a first thermal fuse in a connector.

The accompanying drawings, which form a part hereof, show examples of the disclosure. It is to be understood that the examples shown in the drawings and/or discussed herein are non-exclusive and that there are other examples of how the disclosure may be practiced.

Reference is now made to FIG. 1, which shows an illustration of a connector assembly 100 including thermal fuse 170. The design of the connector assembly 100 is not limiting, and, as will be seen below, additional designs and implementations of connectors and thermal fuses will be discussed. First connector assembly 100 may be bound by a connector housing 110, which may be, for example, cylindrical in shape. Other shapes of the housing 110 may include a generally rectangular box shape, in which case, each face of the generally rectangular box (i.e., a cuboid) shape may be viewed as a different wall of housing 110. In another implementation, the housing 110 may be generally cone-like, namely, wider at a first end, and gradually narrowing to the second end. Additionally, the housing 110 may have any other appropriate shape, including, but not limited to other regular shapes, e.g., a triangular prism, a pyramid, and so forth, as well as various irregular three-dimensional shapes.

A cable 120, comprising an insulating layer 130 on the outside of the cable 120 and a length 140 of conducting material, e.g., copper or aluminum, disposed inside the insulating layer 130, may enter the connector housing 110 at a first end 150. Note that throughout the present specification and accompanying drawings, various lengths of conducting material may be described as being inside an insulating layer, even if, in places, for ease of depiction, said lengths of conducting material may be, in some places, depicted as entering or next to said insulating layer. At an end of the cable 120, the insulating layer may be absent (e.g., may be stripped away), leaving the length 140 of conducting material exposed inside the connector housing 110, as depicted in FIG. 1. A connection, such as a crimp 160, may be formed with the length 140 of conducting material at the stripped end of the cable 120. The connection formed by the crimp may be, in some implementations, a solderless connection. In other implementations, the connection 160 may be a soldered connection, or a screw connection. The crimp 160 may be replaced by any other appropriate conductive material which provides an electrical connection to the length 140 of conducting material, and may be implemented as described herein. The crimp 160 may enable connecting the length 140 of conducting material without solder, which may reduce the effect of corrosion on a joint which could otherwise be a soldered joint, as well as providing an increase in the mechanical stability of the cable, as solder tends to be more prone to mechanical degradation (e.g., due to mechanical or thermal overstressing, poor wetting, wicking along the conducting material, etc.) than the crimp 160. A second end of the crimp 160 may be connected to a length of material which serves as the thermal fuse 170 itself.

Typically, the thermal fuse 170 comprises a low melting temperature alloy. By way of example, the thermal fuse 170 may have a melting point between 50° C.-300° C. In some implementations, the thermal fuse 170 may have a melting point below 200° C. The thermal fuse may be designed in an application specific manner, such that an alloy used in the fuse may be selected based on an expected temperature at anticipated or specified operating currents. By way of example, in a system where an anticipated or specified operating current is 4 A, then the thermal fuse may be designed (e.g., selection of the metal or alloy used in and/or the dimensions of the thermal fuse) dependent on an anticipated operating temperature at a current of 4 A (plus some tolerance and/or margin of error). In a system where an anticipated or specified operating current is 8 A, then the fuse may be designed (i.e., selection of the metal or alloy used in and the dimensions of the thermal fuse) dependent on an anticipated operating temperature at a current of 8 A (plus some tolerance).

The thermal fuse 170 may, at a second end, connect to a first end of a metallic connector pin 180. A second (exposed) end 190 of connector pin 180 may exit a second end 195 of the connector housing 110. The connector pin 180 may not be disposed within the connector housing (and not depicted in FIG. 1, but see FIG. 10A). The exposed end 190 of connector pin 180 may be configured to contact a second connector pin or socket of a coupling connector. For example, the exposed end 190 of connector pin 180 may be designed to easily connect to a second connector pin (not depicted) at a second exposed end (of the second connector pin), either by snapping to the second (exposed) end of the second connector pin, screwing to the exposed end 190, or other appropriate techniques of forming a connection. The cable 120, the length 140 of conducting material, the fuse 170, and the connector pin 180 may comprise a conducting path. The conducting path may be interrupted if the thermal fuse 170 breaks, deforms, melts, etc., and is no longer forming a portion of the conducting path.

Figure 2:
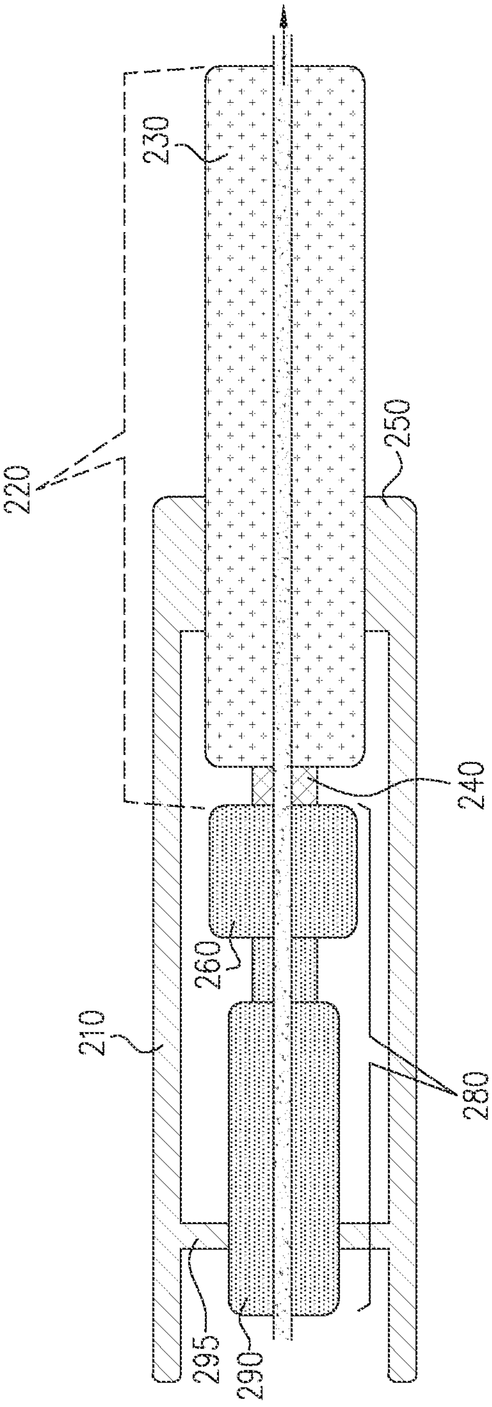
FIG. 2 shows a cross-section of a connector, such as a connector which might be used in a photovoltaic module for generation of electricity.

Reference is now made to FIG. 2, which shows a cross-section of a connector 200, such as a connector 200 which might be used in or with a photovoltaic module for generation of electricity. It is appreciated that the above mention of the photovoltaic module for generation of electricity is by way of example, and other appropriate uses of the connector 200 are not mentioned here for simplicity and as a matter of convenience. A cable 220 may enter a housing 210 at a first end 250 of the housing 210. The cable 220 may be covered with an insulating layer 230, the same as or similar to the insulating layer 130 of the cable 120 of FIG. 1. Within the volume bounded by the housing 210, a length 240 of conducting material of the cable 220 may be exposed (e.g., not covered by the insulating layer 230), similar to the exposed length 140 of conducting material of FIG. 1 inside the housing 110. The length 240 of conducting material of the cable 220 may terminate at a first end crimp 260, similar to crimp 160 of FIG. 1. A second end of crimp 260 may be attached to, or form a part of, a connector pin 280, similar to or the same as connector pin 180. The connector pin 280 may be formed, by way of example, by progressive stamping. Other appropriate manufacturing techniques may be used instead of or in addition to progressive stamping when forming the connector pin 280 and the connector pin 180. For example, the connector pin 280 and the connector pin 180 may be formed by machining, casting, extrusion, deep drawing, stamping, together with metal plating. The metal printing connector pin 280 and the connector pin 180 may also be formed by **3*d* metal printing techniques, including, but not limited to direct metal laser sintering (DMLS) direct metal laser melting (DMLM), and other appropriate 3*d*** metal printing techniques.

The progressive stamping which forms the connector pin 280 may include a metalworking technique that may encompass punching, coining, bending and various other ways of mechanically forming metal raw material, and may be combined with an automatic feeding system where the metal raw material is inserted into a stamping apparatus. Similar to the connector assembly 100 of FIG. 1, the cable 220, the length 240 of conducting material of the cable 220, the crimp 260 and the connector pin 280 may comprise a conducting path. The connector pin 280 may terminate at an exposed end 290. The exposed end 290 may exit the housing 210 at a second end wall 295 of the housing 210. A connection to a second connector, which may be the same as or similar to connector 200 and/or any other connector described herein, may be formed in some cases by snapping, screwing, or another appropriate techniques of connecting two connectors. In other cases, the exposed end 290 of the connector 200 may be forced into place and held in place by pressure. Various examples of connecting the connector 200 and the housing 210 are given below, with reference to FIGS. 8A-10A.

Figure 3:
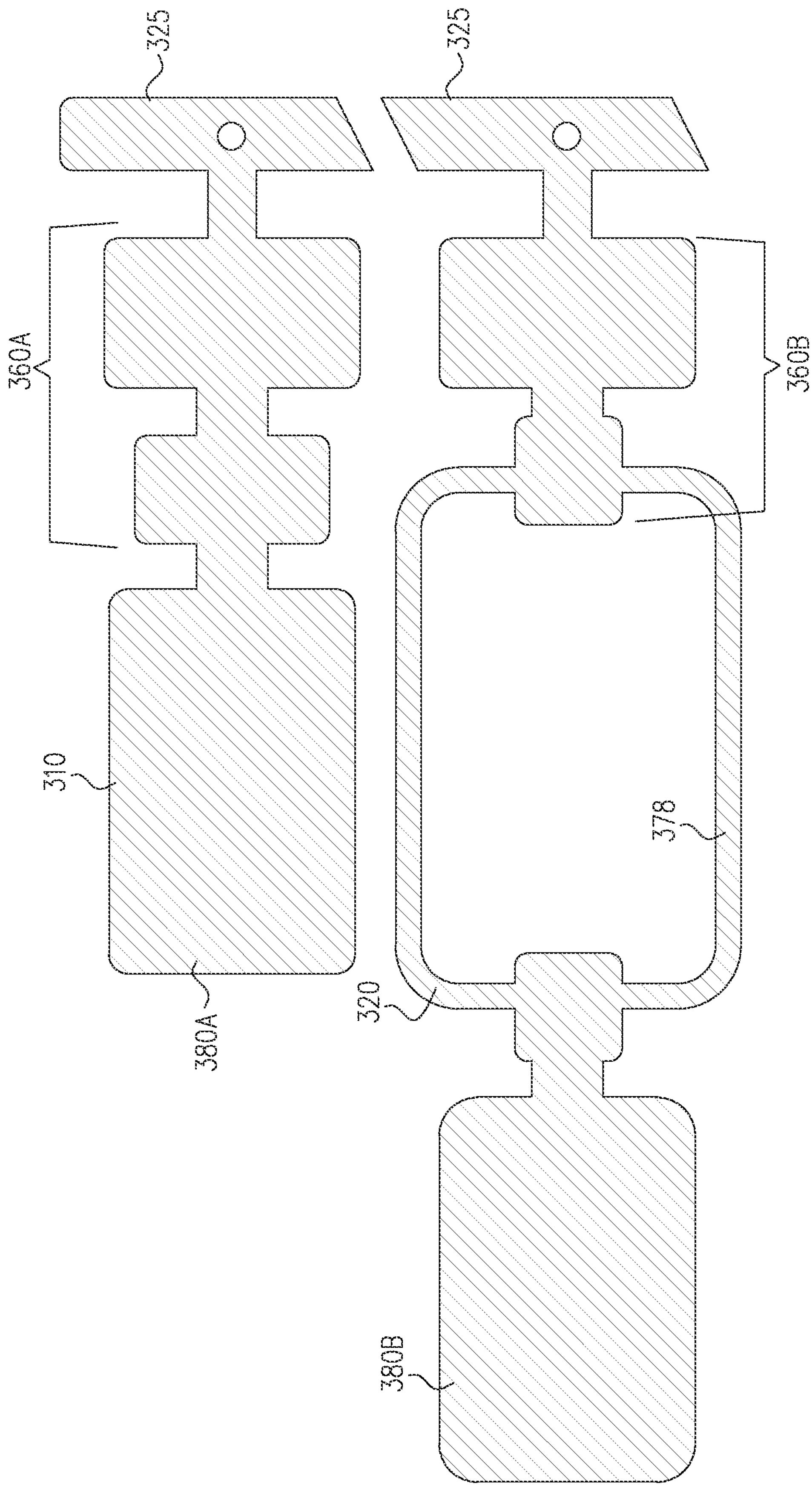
FIG. 3 shows various designs for a phase in a stamping process for manufacturing thermal fuses.

Reference is now made to FIG. 3, which shows various designs for a phase in a stamping process for manufacturing the connector pin 180 and/or crimp 160 (FIG. 1) and connector pin 280 (FIG. 2) for use in thermal fuse assemblies, and similar applications. In the description of FIG. 3, elements such as "connector pin" and "crimp" may be in an unfinished state. Nonetheless, for ease of description, they are referred to as they would be when finished. A first connector pin 380A (e.g., 280) is depicted in FIG. 3 as a portion of metal blank 310. A second connector pin 380B (e.g., 180) is depicted in FIG. 3 as a portion of metal blank 320. The first metal blank 310 is distinguished from the second metal blank 320 by the presence of a window, formed by frame 378. The window, formed by frame 378 is provided so that, for example, a thermal fuse, such as the thermal fuse 170 of FIG. 1, may be disposed within the metal blank 320 between 380B and 360B. The first metal blank 310 and the second metal blank 320 may be formed by progressive stamping, as described above with reference to FIG. 2. A metal sheet, such as, by way of a non-limiting example, tinned copper foil having a thickness of about 0.4 mm, may be subjected to the progressive stamping. The metal sheet may also be, for example, tinned brass, tinned bronze, or a tinned alloy of copper.

When the first metal blank 310 and the second metal blank 320 are formed during progressive stamping, a strip of metal 325 having a hole may remain. The hole may serve as a guide during the process of progressive stamping, so that a plurality of the first metal blank 310 and the second metal blank 320 may be fed through the progressive stamping apparatus as part of the process of forming the first metal blank 310 and the second metal blank 320. The strip of metal 325, may be removed after the progressive stamping process, as it is needed for the progressive stamping process, but not for the actual first metal blank 310 and second metal blank 320.

A crimp 360A, which may be the same as or similar to the crimp 260 of FIG. 2, is formed during the progressive stamping process. A crimp 360B, which may be the same as or similar to the crimp 160 of FIG. 1, is formed during the progressive stamping process. A connector pin 380A, which may be the same as or similar to the connector pin 280 of FIG. 2 is formed during the progressive stamping process. A connector pin 380B, which may be the same as or similar to the connector pin 180 of FIG. 1 is formed during the progressive stamping process.

As part of the progressive stamping process, the metal blank 310 and the second metal blank 320 may be folded so as to form a generally cylindrical shape. For example, and with additional reference to FIG. 6, below, the second metal blank 320 may be folded to form a loosely cylindrical shape, where the connector pin 380B of FIG. 3 generally corresponds to the connector pin 680.

It is appreciated that the stamping process described herein above for forming the connector pins 180 and 280 may be adapted to other appropriate connectors, or other apparatus.

Figure 4:
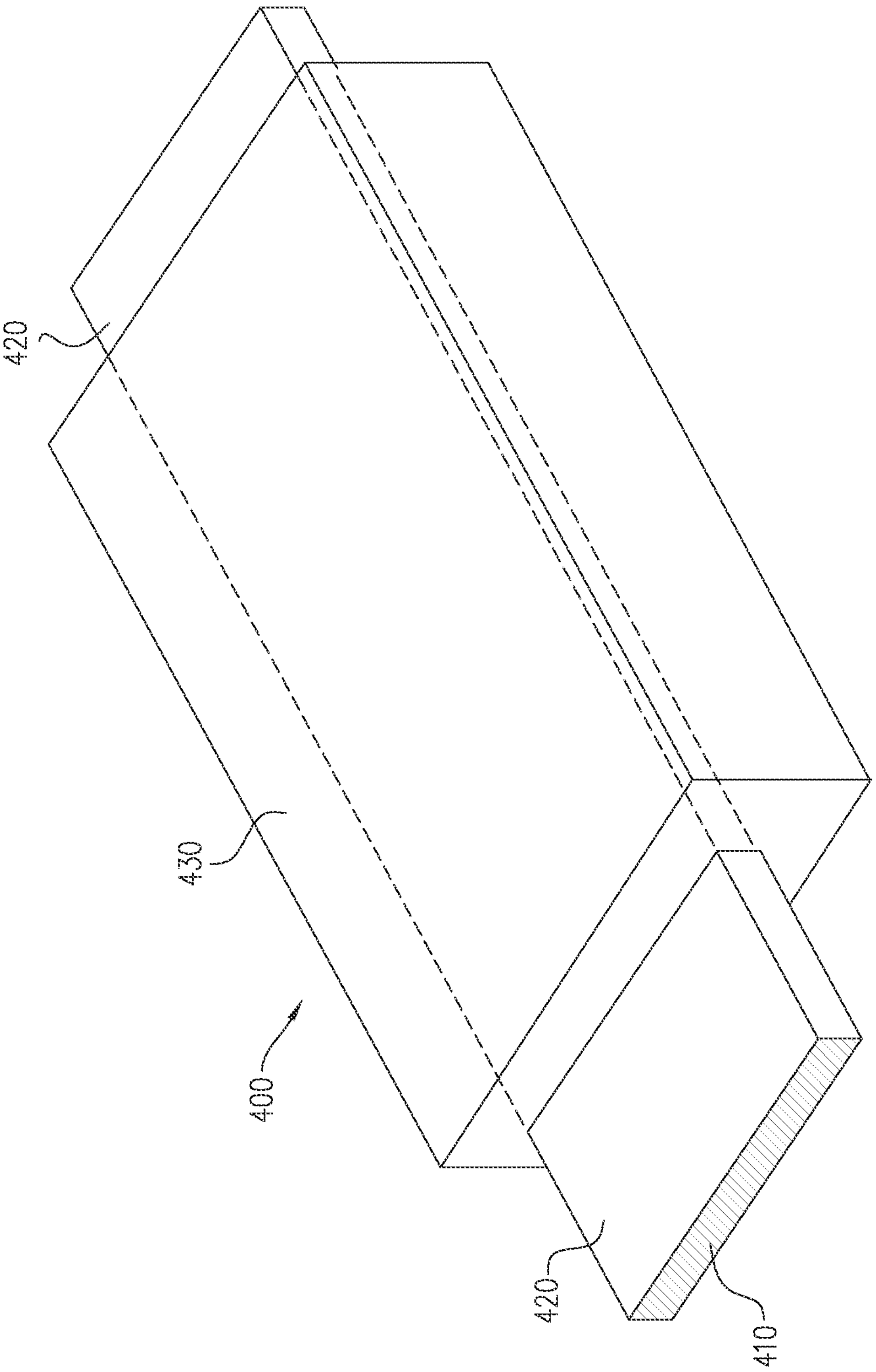
FIG. 4 shows an isometric view of a thermal fuse.

Reference is now made to FIG. 4, which shows an isometric view of a thermal fuse 400. Thermal fuse 400 of FIG. 4 may be the same as, or substantially similar to the thermal fuse 170 of FIG. 1. A core 410 may be entirely surrounded by a copper layer 420 (at either end of the thermal fuse 400). The copper layer 420 may function as a terminal, as will be described below with reference to FIG. 6. The two copper layers 420 and the core 410 form a generally bar shaped member. A conducting portion (e.g., metallic alloy) 430 having a low melting point, which may be an alloy or a non-alloyed metal, overlays the core 410. (The core 410 is displayed entirely surrounded at the portions extending beyond 430 by a copper layer 420). The copper layer 420 may be exposed at either end of the thermal fuse 400.

The core 410 is provided for the thermal fuse 400. The core 410 may be plastic or other appropriate non-conductive/electrically insulative material. The core 410 serves as a base for the thermal fuse 400 providing rigidity to the thermal fuse 400. Additionally, the core 410 serves as a base for metallic layers, to be described shortly. A copper layer 420 is provided on the core 410. A conducting portion (e.g., alloy) 430, with a predetermined melting point (as will be discussed below), can be overlaid upon a base provided by the copper layer 420 and core 410. The conducting portion 430 may be selected for particular implementations on a basis of a melting point based on particular implementation requirements and design specifications. The copper layer 420 may cover the extremities (e.g., ends) of the core 410, and may carry current between a length of a conducting material (e.g., 160, 180) to which the thermal fuse 400 may be connected into a conducting portion (e.g., 430) of the thermal fuse 400. The electrically conducting portion 430 of the thermal fuse 400 may comprise a metal or metallic alloy typically having a melting point lower than the melting point of the copper layer 420, or another typically metallic conductor, such as aluminum, in the length of the connected conducting material.

By way of some non-limiting examples, the conducting portion 430 having a low melting point may comprise metals, alloys, or polymers. Metals and alloys may have a melting point between 50-300 deg. Celsius, such as the following, non-limiting examples:

Tin; (e.g., 231 degrees Celsius (degC) melting point)
Tin and Bismuth alloys (approx. 150 degC melting point),
Tin, Silver, and Copper alloys (e.g., tin 80-98%); (e.g., 220 degC melting point) and
Tin, Iridium, and Bismuth alloys.
Other appropriate percentage combinations of metals may also be used (such as 80-100% Tin, 0-5% Silver, 0-1% copper) to adjust melting point temperature of each of these base alloys. Any other appropriate alloy with a melting point between 100-250 degC may also be used. Such alloys will typically have a resistivity less than $1\times10^{-5}$ Ωm. The remaining percentages will typically comprise other metallic elements with higher melting points, e.g., Copper (melting point 1065 degC) or Aluminum (melting point 660 degC).

Electrically conductive polymer materials may be used with appropriate melting point temperature (e.g., polyphenyl ether, with a melting point of 285 degC, polyphenylene oxide, with a melting temperature typically between 177-222 degC, or polyphenylene sulfide with a melting temperature of 275 degC) may be used as the conducting portion 430 having a low melting point.

Examples of dimensions for the thermal fuse 400 are now provided. The dimensions provided are not meant to exclude any other implementations. Rather, they are one possible set of dimensions (with reference to the example ranges of dimensions mentioned below in the description of FIGS. 5A-5C). By way of one example:

| Dimension | Example Length in mm (range) |
|---|---|
| Length of thermal fuse 400 | 25 (20-40) |
| Width of thermal fuse 400 | 5 (4-7) |
| Height of thermal fuse 400 | 2 (2-4) |
| Length of layer 420 | 3 (2-5) |
| Width of layer 420 | 4 (1-15) |
| Height of layer 420 | 0.6 (0.1-4) |

Figure 5B:
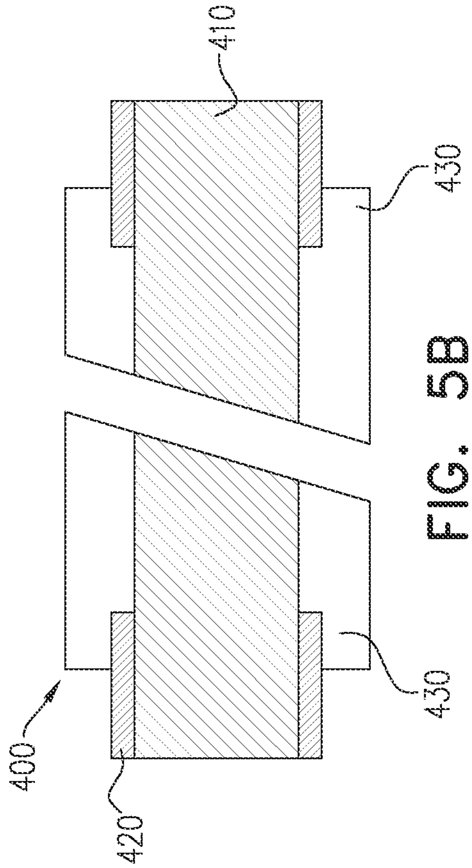
FIG. 5B shows a longitudinal cross section view of the thermal fuse of FIG. 4.
Figure 5C:
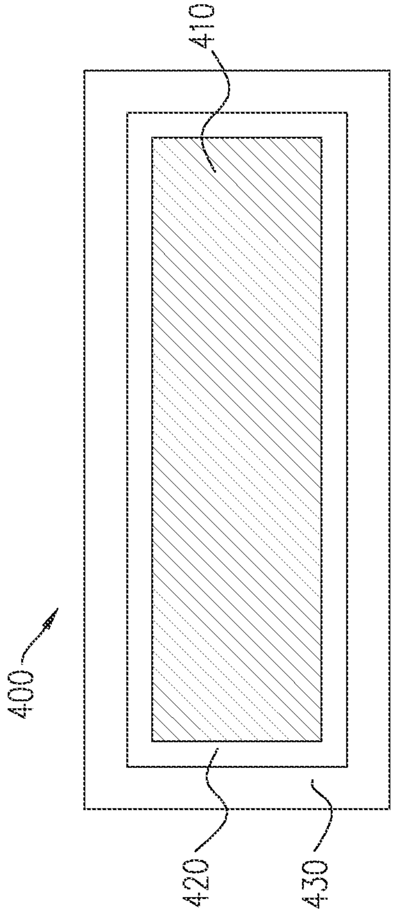
FIG. 5C shows a transversal cross section view of the thermal fuse of FIG. 4.
Figure 5A:
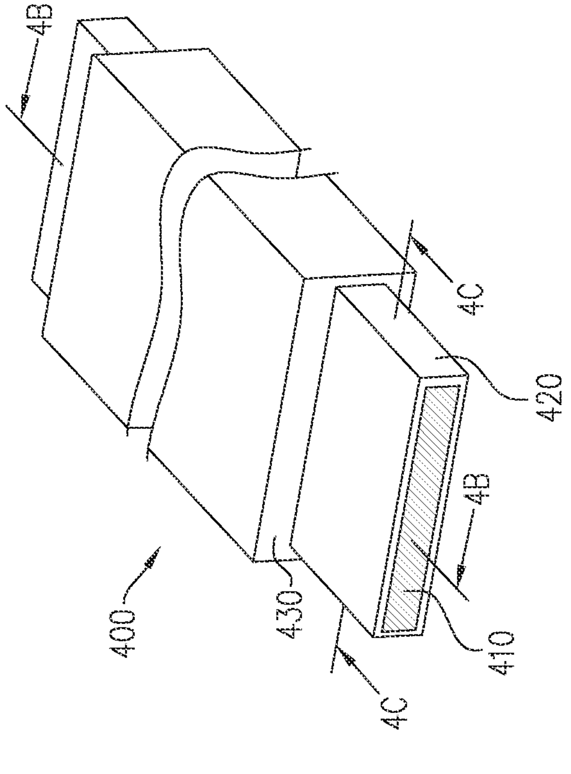
FIG. 5A shows a first cross section view of the thermal fuse of FIG. 4.

Reference is now made to FIGS. 5A-5C, which show the thermal fuse 400 in various views. FIG. 5A shows an isometric cross section view of the thermal fuse 400. FIG. 5B shows a longitudinal cross section view of the thermal fuse. FIG. 5C shows a transversal cross section view of the thermal fuse. The thermal fuse 400 is depicted in FIGS. 5A-5C as a generally elongated cuboid (i.e., a three-dimensional rectangle). As discussed above, with reference to FIG. 1, in other implementations, the thermal fuse 400 may be configured in other appropriate shapes (e.g., cylindrical). Section views 5B and 5C are indicated in FIG. 5A by appropriate section linings, indicated, respectively, as 5B and 5C.

The thermal fuse 400 may be disposed in series with an appropriate connector, for example, between the connector pin 180 and crimp 160 of FIG. 1 or between 380B and 360A in FIG. 3. By way of example, the cross-sectional area of the core 410 may be between 2-9 $mm^2$, the plastic core length may be between 5-40 mm, and the thermal fuse may have a total resistance between 10-4000 μΩ, and a current capacity of 0-45 A.

Figure 6:
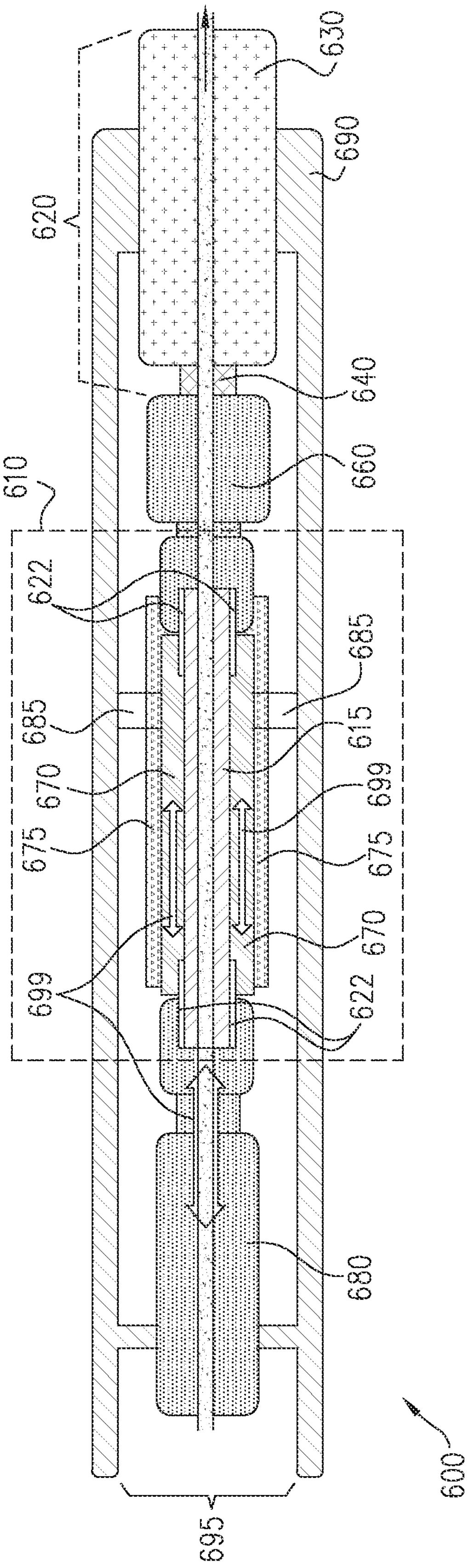
FIG. 6 shows the thermal fuse, e.g., of FIGS. 4 and 5A-5C, in a connector.

Reference is now made to FIG. 6, which shows a first view of thermal fuse 610 in a connector assembly 600. The thermal fuse 670 may be the same as or similar to the first thermal fuse 170 of FIG. 1, as well as the thermal fuse 400 of FIGS. 4 and 5A-5C. The connector assembly 600 may be similar to or the same as the connector assembly 100 of FIG. 1. Additionally, a connector pin 680 and crimp 660 of the connector 600 may be formed by a progressive stamping method similar to that described with reference to the connector pin 380B and crimp 360B formed by progressive stamping of FIG. 3. A coating disposed on a core 615 may comprise conducting portion 670 having a low melting point. The core 615 may correspond to the core 410 of FIG. 4. The core may be formed of a non-conducting material, e.g., a plastic to which the metallic portion will adhere, when applied to the core 615. A copper layer 622 corresponding to copper layer 420 of FIGS. 4 and 5 is shown at the extremes of core 615. It is noted that the copper layer 622 (and the copper layer 420) may function to carry current into the conducting portion having the low melting point. Since the resistance of copper layer 622 may have a lower resistance than conducting portion 670, the copper layer 622 does not cover the entirety of the fuse, thereby leaving the conducting portion 670 as the remaining conducting path for electric current. While layers 420 and 620 are identified as copper, these layers may be any low surface contact resistance material with a lower resistance than conducting portion 670.

A cable 620, comprising an insulating layer 630 on the outside of the cable 620 and a length 640 of conducting material inside the insulating layer 630 may enter the connector housing 690 at a first end. The cable 620, the insulating layer 630 and the length 640 of conducting material may be the same as or similar to the cable 120, the insulating layer 130 and the length 140 of conducting material of FIG. 1. A crimp 660, which may be the same as or similar to the crimp 160 of FIG. 1 is attached, at a first end, to the length 640 of conducting material. The crimp 660 may be attached at a second end to the copper layer 622 coating one end of the thermal fuse assembly 610.

A connector housing 690 may provide an external boundary around the various elements described in FIG. 6. The connector housing 690 itself may form a connector 600 (which may correspond to connector housing 110 of FIG. 1) which may attach, for example, to a second connector 600, at one terminus 695 of the connector 600. Arrows 699 indicate a conducting path in the connector 600, via the thermal fuse 610. Current may flow in either direction along the conduction path.

A layer of meltable or shrinkable sheath (e.g., shrink wrap, shrink tube) 675 may surround the thermal fuse 670. In the event of overheating (such as when the temperature approaches the melting temperature) and/or an arcing event, the meltable and/or shrinkable sheath may deform and or melt, thereby breaking the thermal fuse, as will be described below with reference to FIGS. 7A and 7B. The sheath 675 is a contracting sleeve that shrinks or melts as a result of heat and may include a non-conducting substrate (e.g., a hollow tube). The contraction (e.g., by shrinking or melting) of the sheath 675 breaks an electrical connection in the thermal fuse 670 by pushing melted material away, as will be described below. This mechanical action of the sheath 675 breaks any electric connection present in molten liquid material (e.g., a melted conductive alloy). A washer 685, which may be formed of silicon or another appropriate material, which may be one or both of an electrically nonconductive material and a heat resistant material may be disposed perpendicularly to the layer of meltable and/or shrinkable sheath 675 within the connector 600, and substantially filling a space between two opposing sides of the conductor housing 690. In the event of arcing, the washer may prevent the arc from spreading from one end of the connector 600 to the other end of the connector 600.

The sheath 675 may comprise: an elastomeric sheath which contracts at a contraction temperature over 150° C.; a polyolefin sheath which contracts at a contraction temperature over 135° C.; a silicone rubber sheath which contracts at a contraction temperature over 200° C.; a polytetrafluoroethylene sheath which contracts at a contraction temperature over 175° C., or a sheath 675 of another appropriate material. Typically, sheath 675 may be selected so that contraction temperature of the sheath 675 is less than a melting temperature of the thermal fuse. By way of an example, the sheath 675 may contract at a temperature 20° C. lower (or more) than the melting point of the electrically conductive material (e.g., a fusible alloy, as discussed below).

The core 615, the copper layer 622, conducting portion 670, layer of meltable and/or shrinkable sheath 675, and the washer 685 may form and be referred to herein as a "thermal fuse assembly" 610. In some implementations of the thermal fuse assembly 610, the washer may be absent.

Figure 7A:
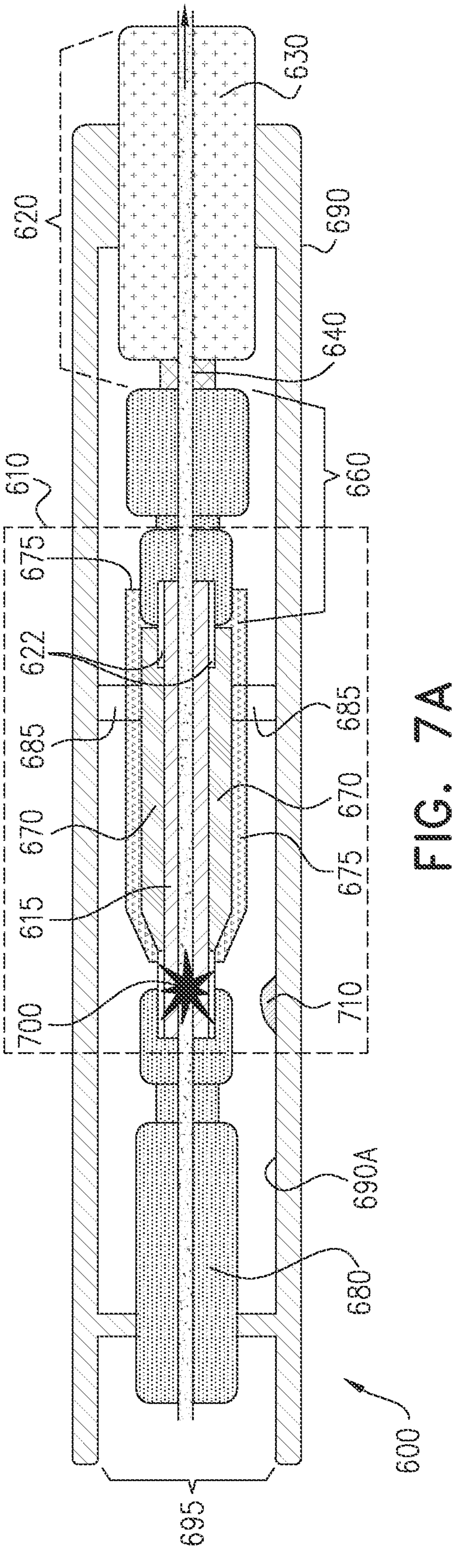
FIG. 7A shows the thermal fuse during an arcing event.
Figure 7B:
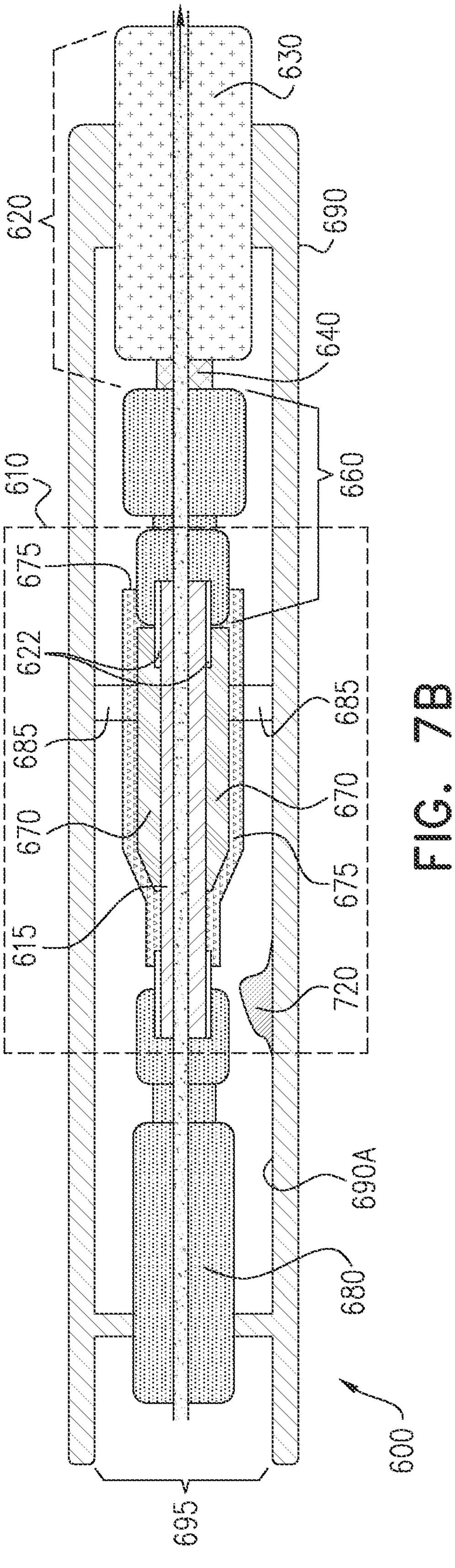
FIG. 7B shows the thermal fuse of FIG. 7A after the arcing event.

Reference is now made to FIGS. 7A and 7B. FIG. 7A shows the thermal fuse of FIG. 6 during an example overheating (e.g., due to electrical arcing) event. FIG. 7B shows the thermal fuse of FIG. 7A after the example overheating event. A damaged electrical conduction path (e.g., due to corroded contact, moisture, dirt ingress, etc.) may result in an elevated temperature in connector 600. In some cases, an arc 700 which may occur across the connector 600 may result in an elevated temperature. An electric arc, such as the arc 700, typically has a very high current density. Electrical resistance along the arc 700 creates heat, which typically ionizes gas molecules (where the degree of ionization is determined by temperature of the arc 700). In order to prevent a failure resulting from the arc 700, a fuse assembly 610, which may comprise the conducting portion 670 with lower melting temperature, may be provided within the connector 600 in order to break the electric circuit as a result of the elevated temperature caused by the electric arc 700.

As the arc 700 (or other example overheating event) raises the temperature within the connector, the low melting temperature conducting material 670 may deform or begin to melt (as was noted above, with reference to FIG. 1, the thermal fuse may comprise a metal or an alloy (e.g., the low melting temperature conducting material 670) having a melting point between 50° C.-300° C. (for example a fusible alloy may having a melting point between 150° C. and 200°

C.). In some examples, the alloy may have perforations. As the alloy melts, the molten alloy 710 may drip or flow onto the inside wall 690A of the connector 600. The elevated temperature may also cause the meltable and/or shrinkable sheath 675 to shrink or melt in the area from which the alloy flowed, thus insulating 622 from the un-melted portion of the low melting temperature conducting material 670. As the alloy melts, the conduction path 699 no longer remains in place, which may lead, in turn to the arc dissipating. As the arc dissipates, the temperature may drop, and the molten allow 710 which dripped onto the inside wall 690A of the connector 600 may resolidify, leaving a slab 720 of the molten alloy adhering to the inside wall 690A of the connector.

Figure 8A:
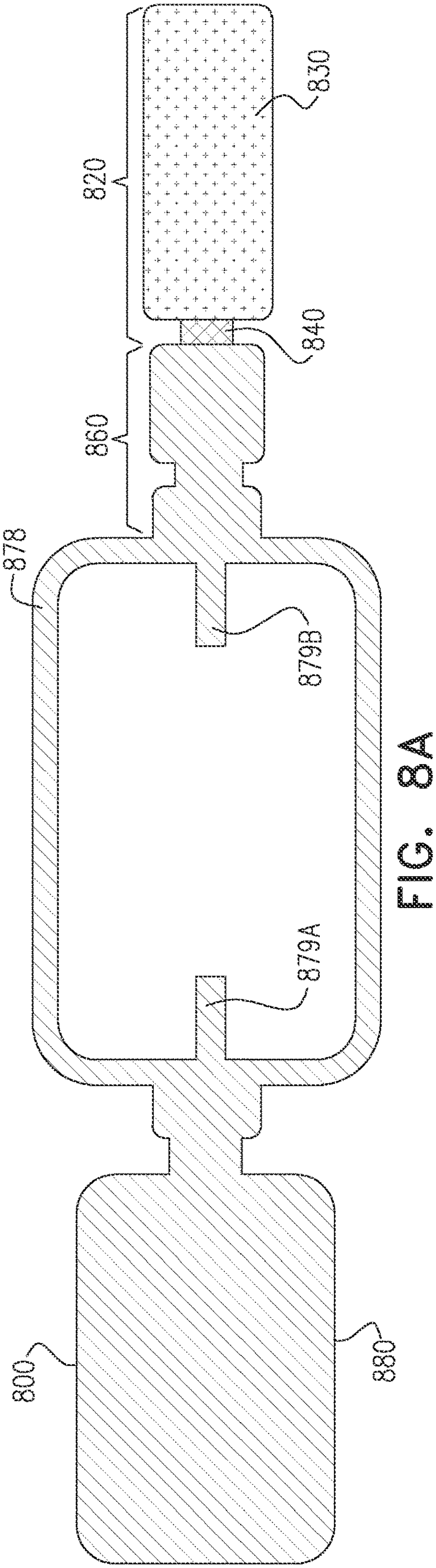
FIGS. 8A and 8B show a thermal fuse assembly.
Figure 8B:
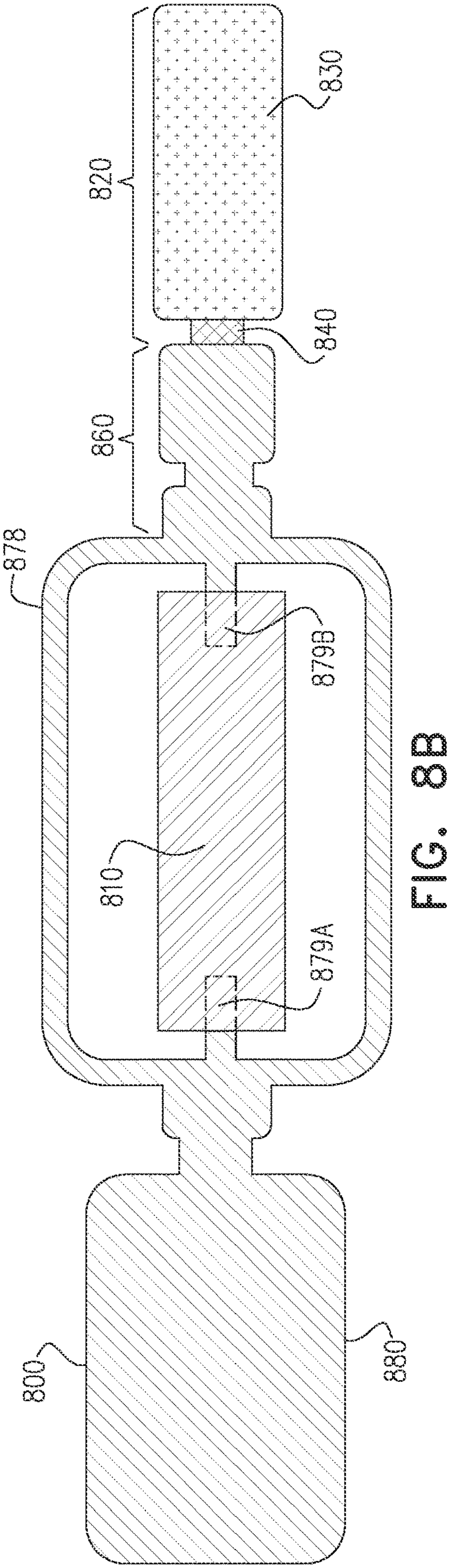

Reference is now made to FIGS. 8A and 8B, which show another example of connecting a thermal fuse assembly 810 inside a connector 800. The connector 800 may be the same as or similar to the connector assembly 100 of FIG. 1, the metal blank 320 of FIG. 3, and the connector 600 of FIG. 6. As discussed above with reference to FIG. 3, the connector 800 may require folding in order to form a completed connector 800, which may more closely resemble the connector 600 (by way of example) of FIG. 6.

A metallic pin 880, which may be similar to connector pin 180 of FIG. 1 is disposed at one end of a window, formed by frame 878. A first pin 879A and a second pin 879B may connect the thermal fuse assembly 810 within the window, formed by frame 878 inside the connector 800. A crimp 860 is at the second end of the connector 800. The thermal fuse assembly 810 may generally correspond to the portions 610 of FIG. 6 disposed between the connector pin 680 and the crimp 660 of FIG. 6. After assembly, the frame 878 may be removed, leaving the thermal fuse assembly as the only conducting path between connector pin 880 and crimp 860.

Figures 9A, 9B, 9C:
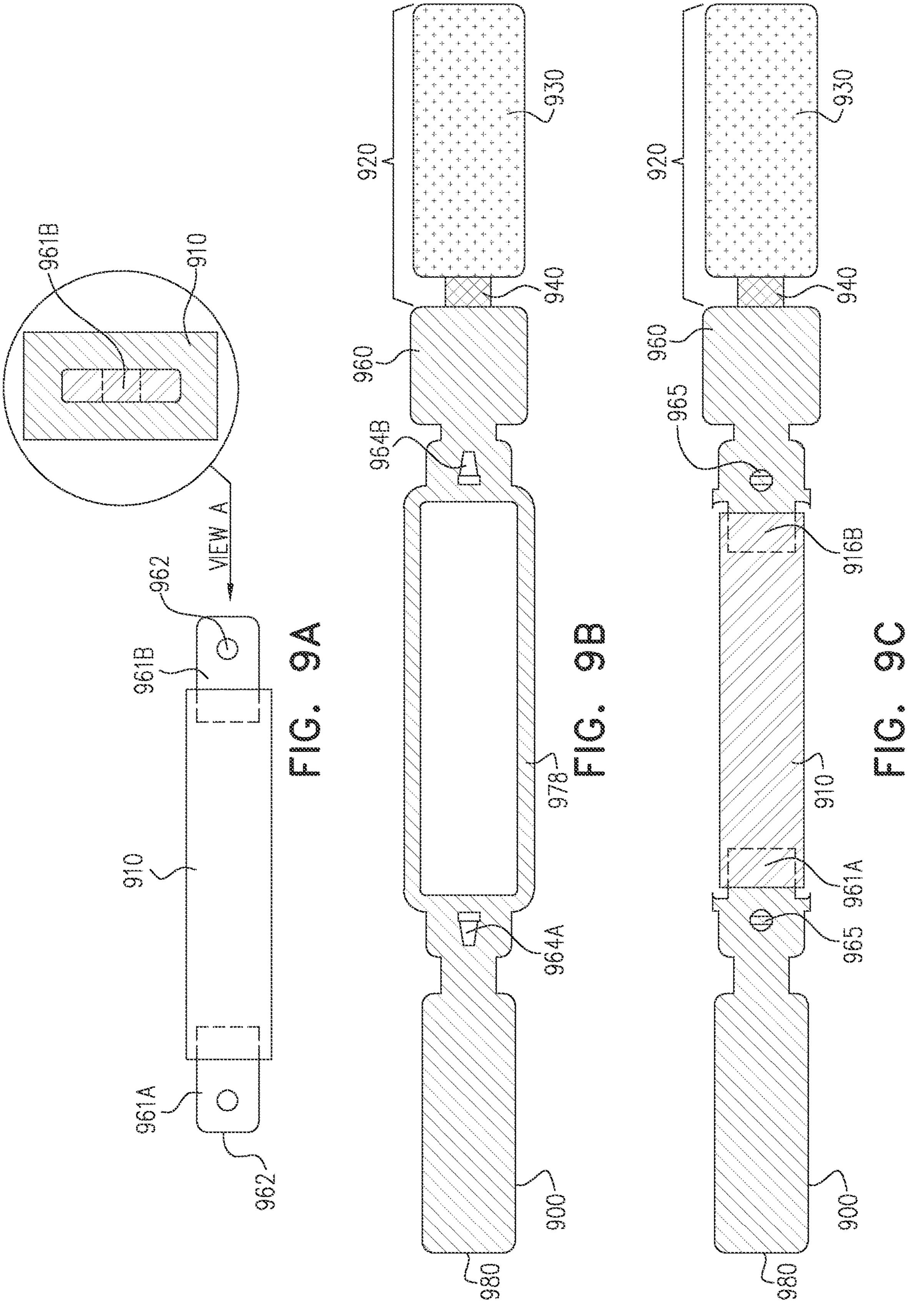
FIGS. 9A-9C show a thermal fuse assembly.

Reference is now made to FIGS. 9A-9C, which show another example of connecting a thermal fuse assembly 910 within a connector 900. FIG. 9A shows thermal fuse assembly 910 with a left joint 961A and a right joint 961B. The left joint 961A and the right joint 961B may be fashioned out of tinned copper, or other appropriate metals. View A provides a side view of the thermal fuse assembly 910 and right joint 961B. The left joint 961A and the right joint 961B may each have a hole 962 which may be used in forming a connection between the thermal fuse assembly 910 and the connector 900. Connector 900 (FIGS. 9B and 9C) may be the same as or similar to the connector assembly 100 of FIG. 1 the metal blank 320 of FIG. 3, the connector 600 of FIG. 6, and connector 800 of FIG. 8. The thermal fuse assembly 910 may be the same as or similar to the thermal fuse 400 of FIGS. 4 and 5A-5C, the thermal fuse assembly 610, and other thermal fuse described herein above. The connector 900 may have, at a first end, a crimp 960. Crimp 960 may be the same as or similar to the crimp 160 of FIG. 1, crimp 360B of FIG. 3, crimp 660 of FIGS. 6, crimp 860 of FIG. 8, and other crimps described herein. The connector 900 may have, at a second end, a connector pin 980. Connector pin 980 may be the same as or similar to connector pin 180 of FIG. 1, the connector pin 320 of FIG. 3, and/or other connector pins described herein above. A cable 920 an insulating layer 930 on the outside of the cable 920 and a length 940 of conducting material inside the insulating layer 930 may be connected to connector 900 via crimp 960 as described above with respect to FIGS. 1, 2, 6, and 8.

A window, formed by frame 978, may be situated in the connector 900. The thermal fuse assembly 910 may be inserted in the window formed by the frame 978 and generally connected to the assembly at 980 by the left joint 961A and at 960 by the right joint 961B. A pin 964A and a pin 964B or other extrusion from the connector 900 may be inserted in the holes 962. A press fit connection 965 may be formed by applying pressure to the pin 964A and the pin 964B or other tab/extrusion from the connector 900. The pins can be sealed or bent into place in the holes 962, forming a press fit connection 965. After assembly, the frame 978 may be removed, leaving the thermal fuse assembly as the only conducting path between connector pin 980 and crimp 960.

Figure 10A:
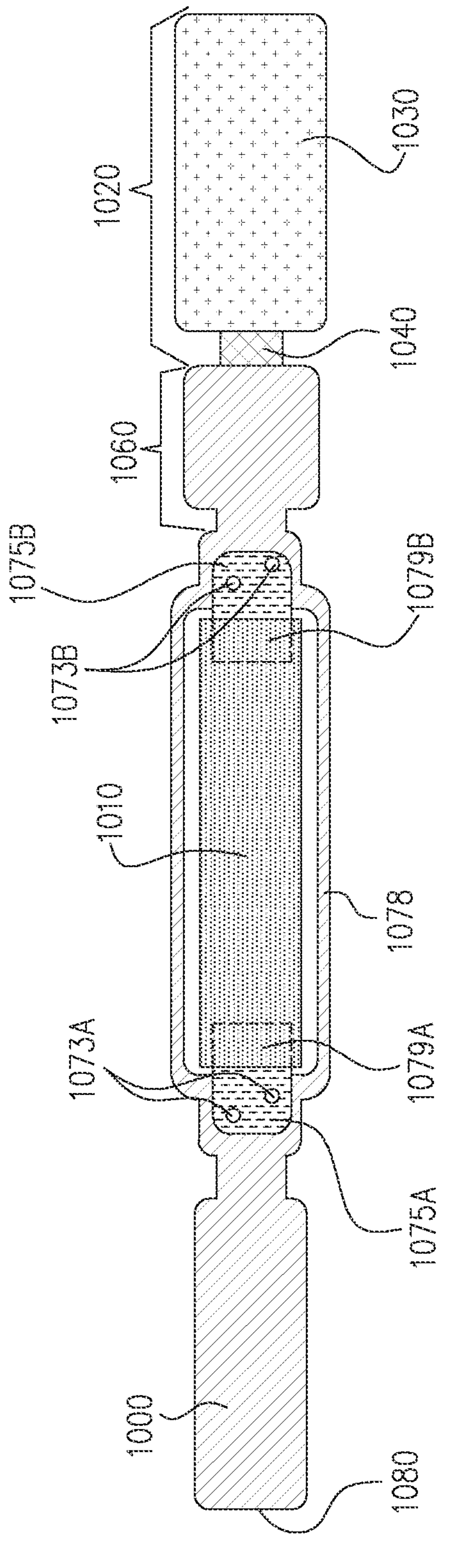
FIG. 10A shows a thermal fuse assembly.

Reference is now made to FIG. 10A which shows another example of connecting the thermal fuse assembly 1010 inside a connector 1000. The connector 1000 may be the same or similar to the connector assembly 100 of FIG. 1, the metal blank 320 of FIG. 3, and the connector 600 of FIG. 6, the connector 800, and other connectors described herein. The thermal fuse assembly 1010 may be the same as or similar to the thermal fuse 170 of FIG. 1, thermal fuse 400 of FIGS. 4 and 5, the thermal fuse assembly 610 of FIG. 6, the thermal fuse assembly 810 of FIG. 8, the thermal fuse assembly 910 of FIG. 9, and other thermal fuses described herein.

A cable 1020, typically comprising an insulating layer 1030 on the outside of the cable 1020 and a length 1040 of conducting material inside the insulating layer 1030 may enter the of the connector 1000 at a first end. The cable 1020, the insulating layer 1030 and the length 1040 of conducting material may be the same as or similar to the cable 120, the insulating layer 130 and the length 140 of conducting material of FIG. 1, or other cables, insulating layers, and lengths of conducting material described herein. A crimp 1060, which may be the same as or similar to the crimp 160 of FIG. 1 or other crimps described herein is attached, at a first end, to the length 1040 of conducting material. The crimp 1060 may be attached at a second end to the thermal fuse assembly 1010.

The connector 1000 may have, at a second end, a connector pin 1080, which may be the same as or similar to connector pin 180 of FIG. 1, the connector pin 320 of FIG. 3, and other connector pins described herein above. A window, formed by frame 1078, may be situated in the connector 1000. The thermal fuse assembly 1010 may be inserted in the window formed by the frame 1078 and attached to terminals 1079A, 1079B. Terminals 1079A, 1079B extend from within the thermal fuse assembly 1010 to the connector 1000 at terminals 1075A, 1075B. Terminals 1075A, 1075B may be welded, for example, by using resistance welding at two or more welding points 1073A, 1073B on each of terminals 1075A, 1075B.

Resistance welding may be used to join metals by applying pressure and passing current for a length of time through the metal area which is to be joined. When using resistance welding, typically, no other materials are needed to create a bond between the terminals 1075A, 1075B and the connector 1000. After assembly, the frame 1078 may be removed, leaving the thermal fuse assembly as the only conducting path between connector pin 1080 and crimp 1060.

In addition to the techniques for connecting the thermal fuse assembly 810, 910, 1010 inside the connector 800, 900, 1000 mentioned above with reference to FIGS. 8A-10, the thermal fuse assembly 810, 910, 1010 may also be connected inside the connector 800, 900, 1000 using friction welding, soldering, ultrasonic welding, brazing, magnetic pulse welding, crimping, and magnetic pulse crimping. The above list and descriptions are provided by way of example, and not intended to be limiting.

Reference is now made to FIGS. 10B-10G. The connector 1000 having the a connector pin 1080, as well as the cable 1020, the insulating layer 1030 and the length 1040 of conducting material and the crimp 1060 are all present in FIGS. 10B-10G. The connector 1000 having the a connector pin 1080, as well as the cable 1020, the insulating layer 1030 and the length 1040 of conducting material, the crimp 1060, and the frame 1078 for the sake of brevity, will not be discussed, but rather, the description above, with reference to FIG. 10A is relied upon.

Figure 10B:
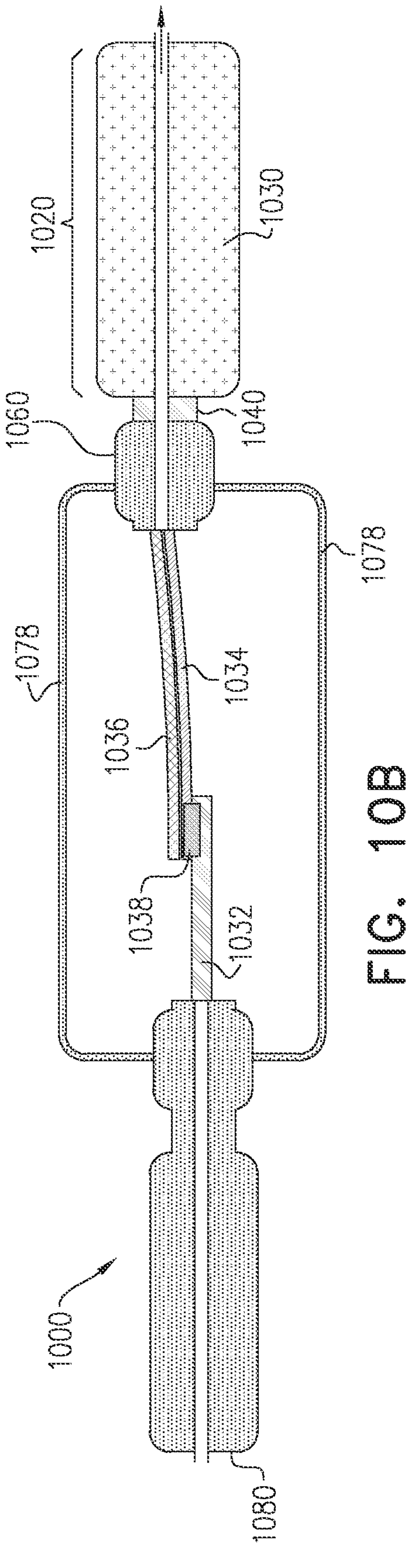
FIG. 10B shows a first spring based thermal fuse assembly in a closed state.
Figure 10C:
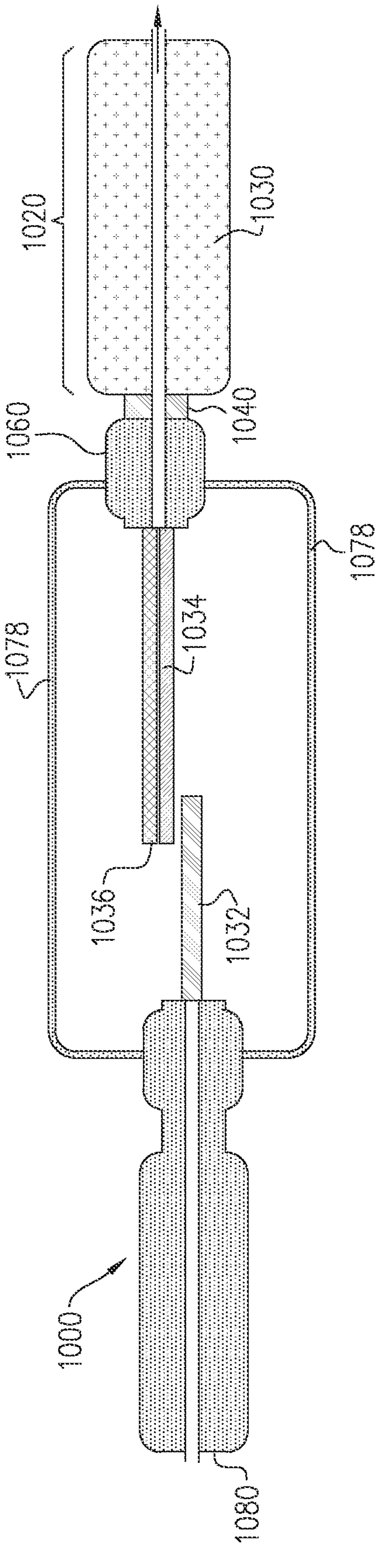
FIG. 10C shows the first spring based thermal fuse assembly in an open state.

Turning specifically to FIGS. 10B and 10C, FIG. 10B shows a first spring based thermal fuse assembly in a closed state, and FIG. 10C shows the first spring based thermal fuse assembly in an open state. A first conducting element 1032 (for instance a copper, aluminum wire) may extend from the connector 1000. A second conducting element 1034 (which may also be a copper or an aluminum wire) extends from the crimp 1060. A spring 1036, for example a leaf spring, also referred to as a semi-elliptical or elliptical spring, which may be a slender arc-shaped length of spring material (for instance, a low-alloy manganese, medium-carbon steel or high-carbon steel with a very high yield strength), overlays a first side of the second conducting element 1034 in a primed (e.g., storing potential energy) state. The first conducting element 1032 and the second conducting element 1034 may be connected by a low melting temperature alloy 1038 (which may be the same or similar to the low melting temperature alloy 670 of FIG. 6). Current may flow between the first conducting element 1032 and the second conducting element 1034 as long as the low melting temperature alloy 1038 is present. Should the low melting temperature alloy 1038 melt, for instance, in the event of an arcing event during which the temperature rises above the melting point of the low melting temperature alloy 1038, the spring may be released (returning to an undeformed state), and the first conducting element 1032 and the second conducting element 1034 may no longer be connected, as depicted in FIG. 10C.

Figure 10D:
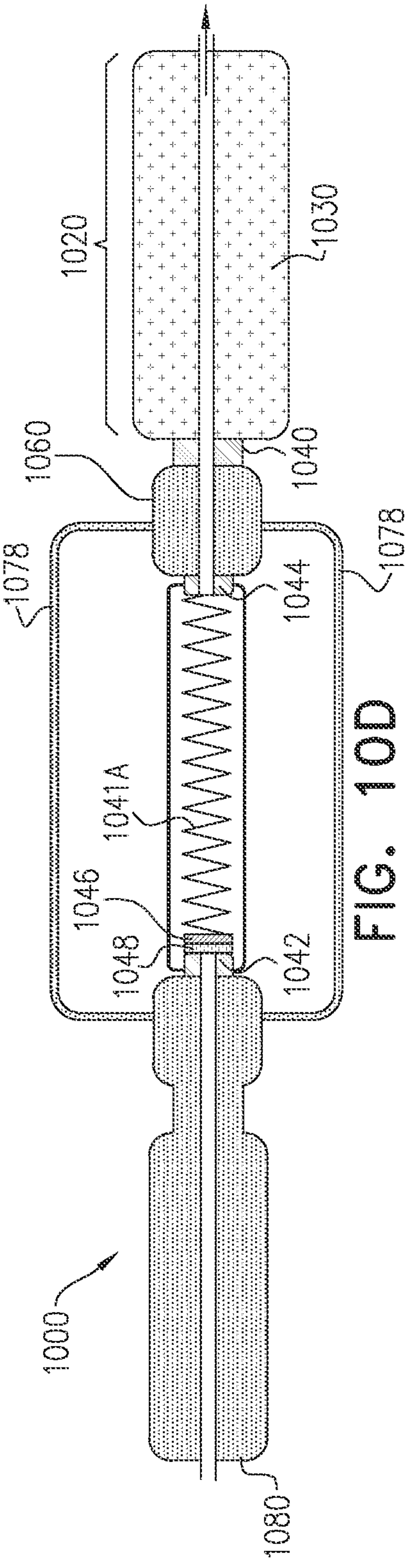
FIG. 10D shows a second spring based thermal fuse assembly in a closed state.
Figure 10E:
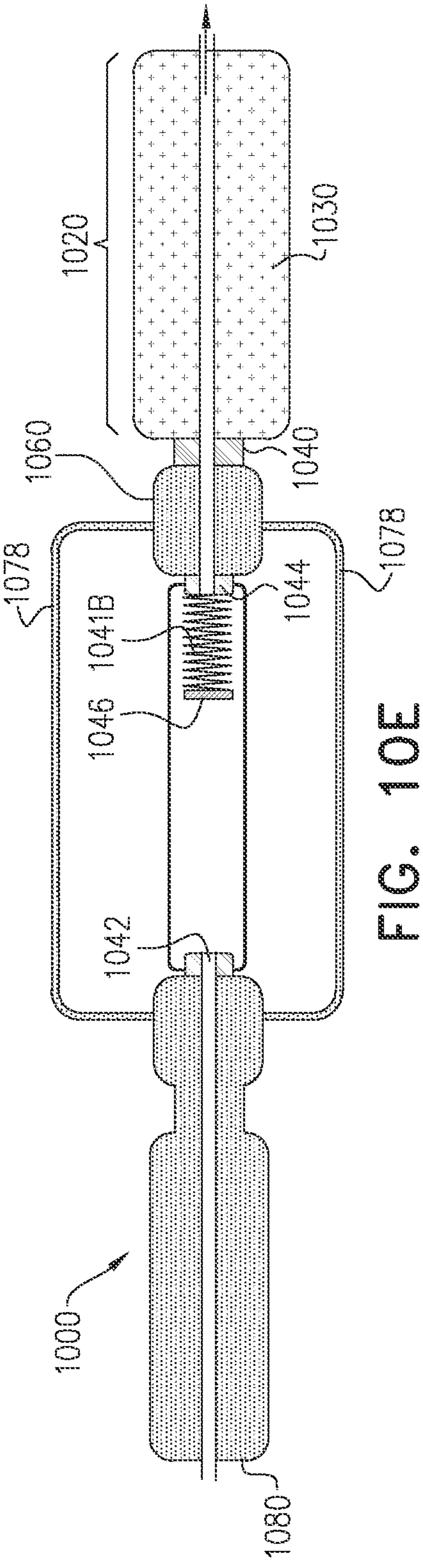
FIG. 10E shows the second spring based thermal fuse assembly in an open state.

Turning specifically to FIGS. 10D and 10E, FIG. 10D shows a second spring based thermal fuse assembly in a closed state. Specifically, a helical spring 1041A may connect between the connector 1000 and the crimp 1060. A first conducting element 1042 may be present at a terminus of the connector 1000. The first conducting element 1042 may be connected to a low melting temperature alloy 1048, which may be the same as or similar to the low melting temperature alloy 1038 of FIGS. 10B and 10C, and the low melting temperature alloy 670 of FIG. 6. The low melting temperature alloy 1038 may be connected, on a second side, to a terminus 1046 of the helical spring 1041A. At a second side, the helical spring 1041A may be connected to a second conducting element 1044, which may be the same as or similar to second conducting element 1044. Should the low melting temperature alloy 1048 melt, for instance, in the event of an arcing event during which the temperature rises above the melting point of the low melting temperature alloy 1048, the spring 1041A may be released, contract, as depicted by spring 1041B in FIG. 10E.

Figure 10F:
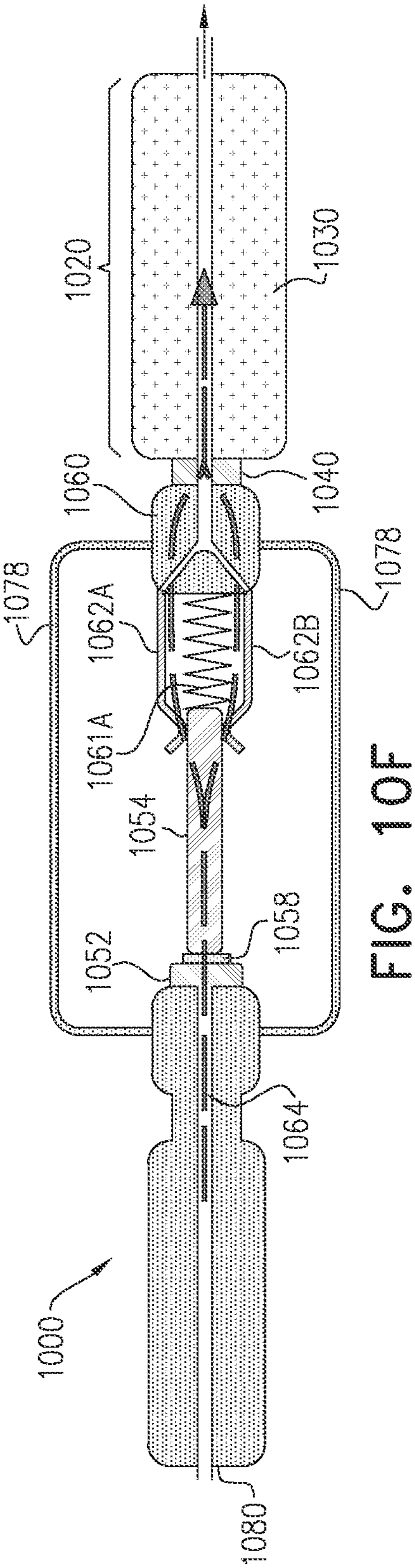
FIG. 10F shows a third spring based thermal fuse assembly in a closed state.
Figure 10G:
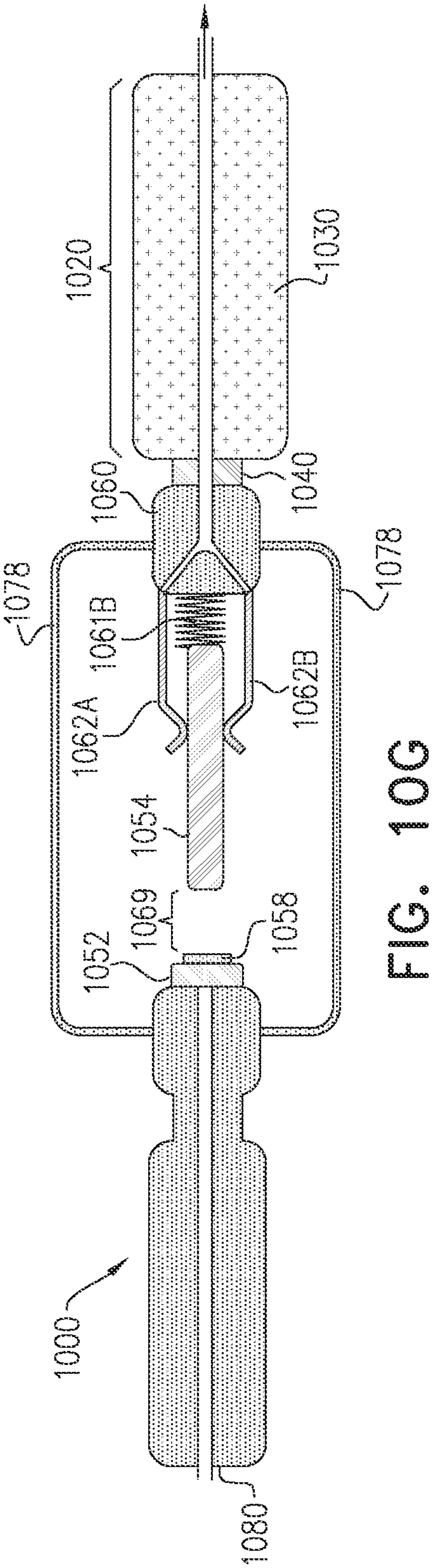
FIG. 10G shows the third spring based thermal fuse assembly in an open state.

Turning now to FIGS. 10F and 10G, FIG. 10F shows a third spring based thermal fuse assembly in a closed state. Specifically, a first conducting element 1052 (for instance a copper, aluminum wire) may extend from the connector 1000. The first conducting element 1052 may terminate at a low melting point alloy terminus 1058. A second conducting element 1054 may be connected to the terminus 1058 at one side, and may be held by current carrying wings 1062A, 1062B at a second side. A spring, which might be, for example, as stainless steel or other appropriate material spring 1061A may be disposed between the second conducting element 1054 at one side and the crimp 1060 at the second side, and surrounded by the current carrying wings 1062A, 1062B. Should the low melting temperature alloy 1058 melt, for instance, in the event of an arcing event during which the temperature rises above the melting point of the low melting temperature alloy 1058, the spring 1061 may then contract, as depicted by spring 1061B in FIG. 10G. In such a case a gap 1069 is effectively created between the first conducting element 1052 and the second conducting element 1054. An example of how electrical current may flow through the connector is provided in FIG. 10F by dashed arrow 1064.

Figure 10H:
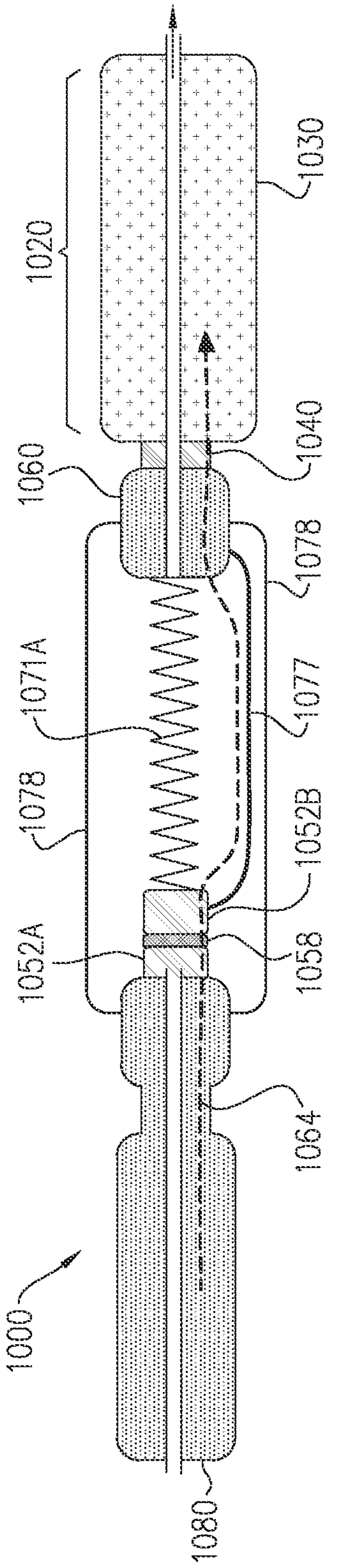
FIG. 10H shows a fourth spring based thermal fuse assembly in a closed state.
Figure 10I:
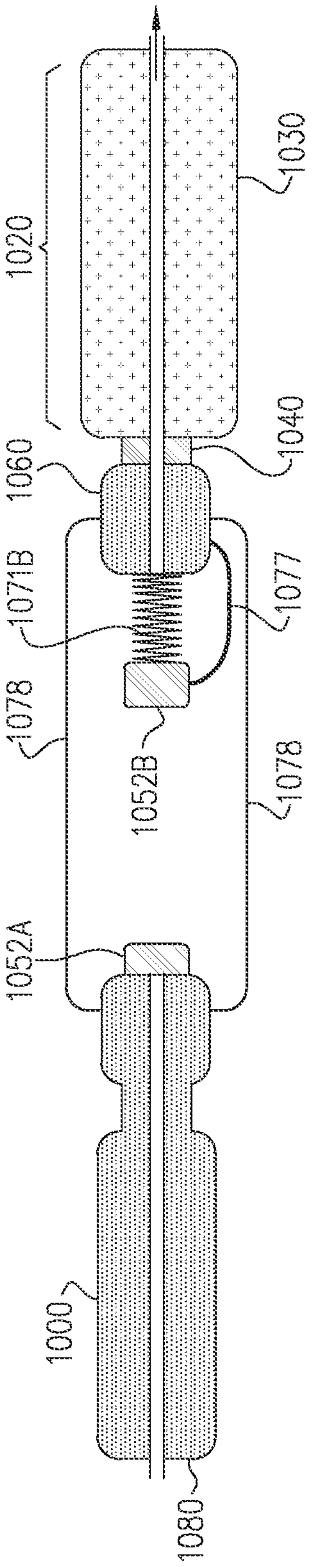
FIG. 10I shows the fourth spring based thermal fuse assembly in an open state.

Turning now to FIGS. 10H and 10I, FIG. 10H shows a fourth spring based thermal fuse assembly in a closed state. Specifically, a first conducting element 1052A (for instance a copper, aluminum wire) may extend from the connector 1000. The first conducting element 1052A may terminate at a low melting point alloy terminus 1058. A second conducting element 1052B (for instance a copper, aluminum wire) may be connected to the terminus 1058 at one side, and may be held by a spring 1071A at a second side. The second conducting element 1052B may be connected to a first end of a conducting wire 1077 (which may, for example, a copper or aluminum wire) at one end. At a second end, the conducting wire 1077 may be connected to length 1040 of conducting material via the crimp 1060. Should the low melting temperature alloy 1058 melt, for instance, in the event of an arcing event during which the temperature rises above the melting point of the low melting temperature alloy 1058, the spring 1071A may then contract, as depicted by spring 1071B in FIG. 10I. In such a case, the second conducting element 1052B is drawn away from the first conduction element 1052A as the spring 1071B retracts. A conducting path is thereby broken when the conducting wire 1077, which is attached to the second conducting element 1052B is drawn away with the second conducting element 1052B.

Figure 10J:
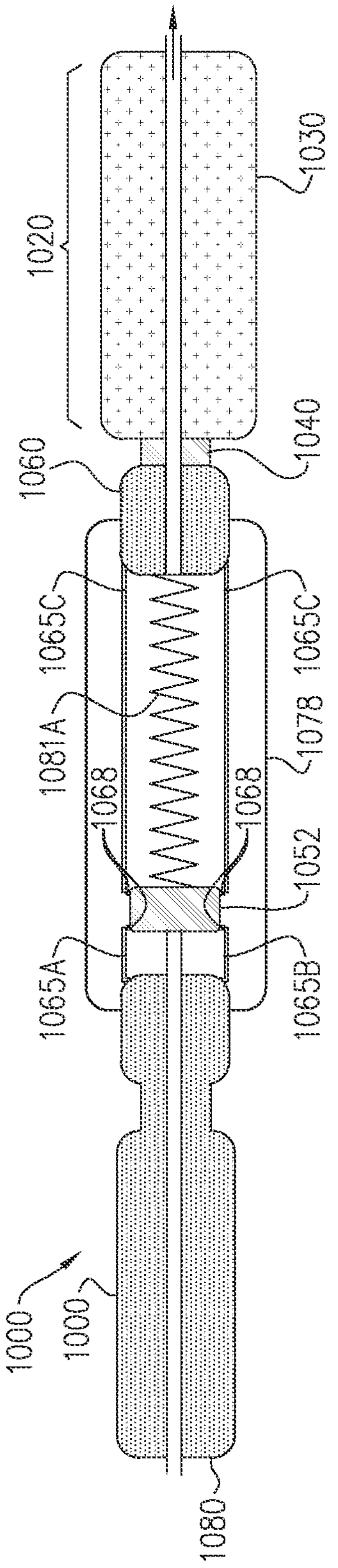
FIG. 10J shows a fifth spring based thermal fuse assembly in a closed state.
Figure 10K:
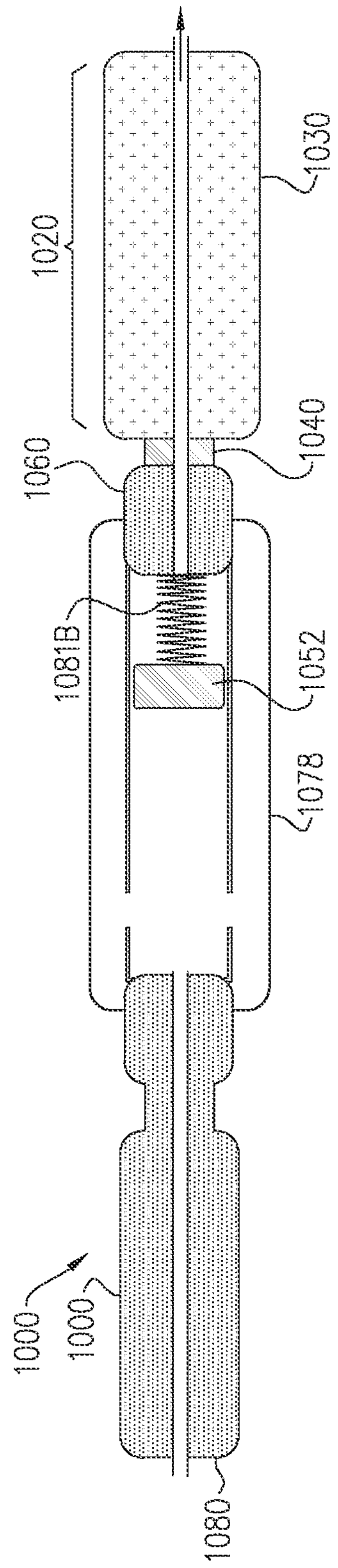
FIG. 10K shows the fifth spring based thermal fuse assembly in an open state.

Turning now to FIGS. 10J and 10K, FIG. 10H shows a fifth spring based thermal fuse assembly in a closed state. Specifically, a first conducting element 1052 (for instance a copper, aluminum wire) may be attached to the connector 1000 via a first frame formed of at least one second conducting element 1065A, 1065B (for instance a copper, aluminum wire). The first conducting element 1052 may be attached to the at least one second conducting element 1065A, 1065B by a low melting temperature alloy 1068. A second frame formed of at least one second conducting element 1065C, 1065D (for instance a copper, aluminum wire) may be attached at a second end of the first conducting element 1052. The first conducting element 1052 may be further be connected to a spring 1081A. Should the low melting temperature alloy 1068 melt, for instance, in the event of an arcing event during which the temperature rises above the melting point of the low melting temperature alloy 1068, the spring 1081A may then contract, as depicted by spring 1081B in FIG. 10K.

Figure 11:
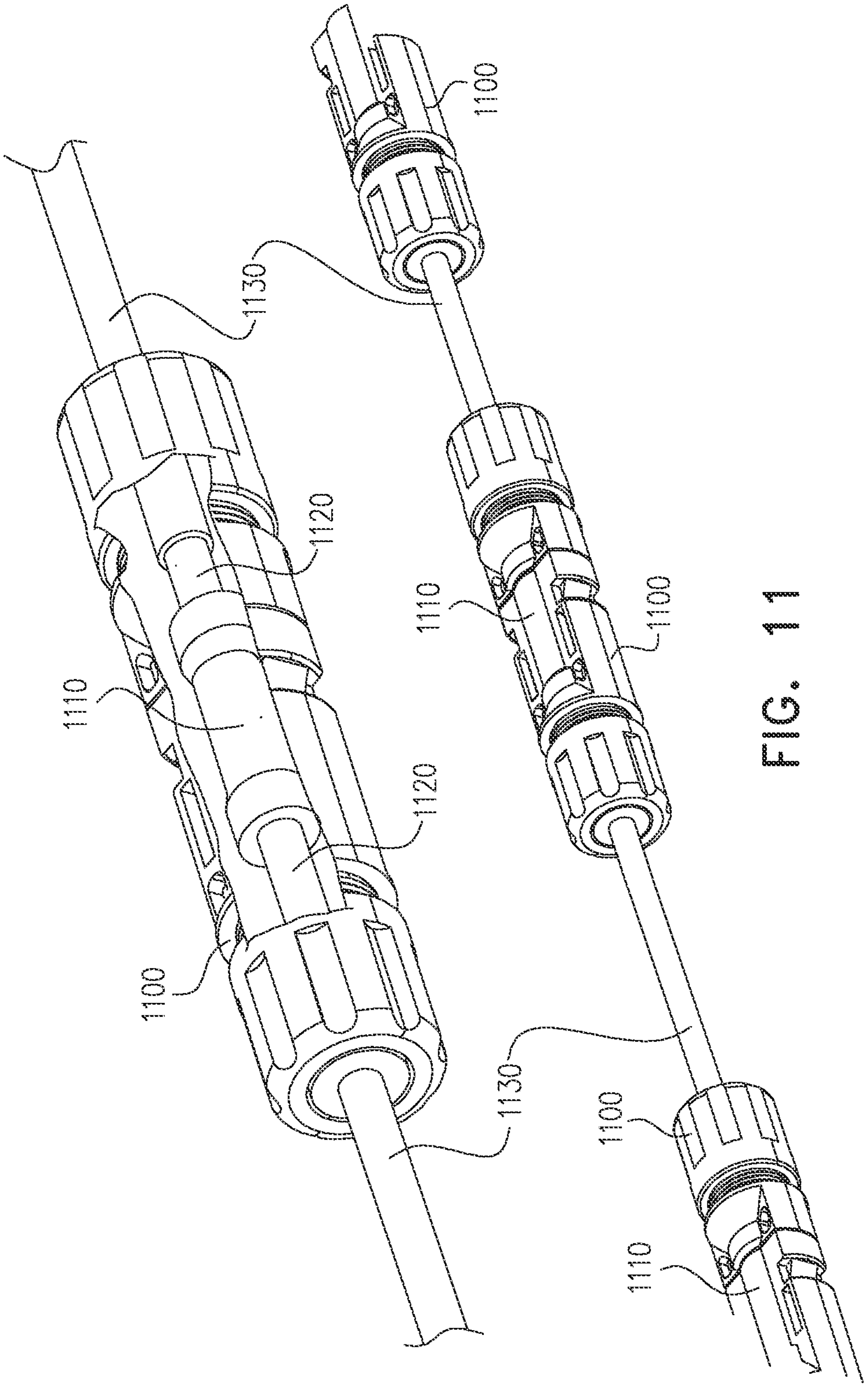
FIG. 11 shows the thermal fuse in a connector, for example, in a photovoltaic energy system.

Reference is now made to FIG. 11, which shows the thermal fuse in a connector, for example, in a photovoltaic energy system. It is appreciated that FIG. 11 and other figures in the present disclosure may not be drawn to scale. A connector 1100 is seen with a cut away portion of the depiction of the connector. A thermal fuse assembly 1110 is seen within the connector 1100. An electrical cable 1120 connects between the thermal fuse assembly 1110 inside the connector 1100 and a second electrical cable 1130 outside the connector 1100. The second electrical cable 1130 extends to a second connector 1100. Thermal fuse assembly 1110 and connector 1100 may be an example of any of the thermal fuses, thermal fuse assemblies, and connectors described above.

The thermal fuse, when used, for example in a photovoltaic system (as will be discussed below, with reference to FIG. 13) may be used to form a connection with a cable at an output of a solar panel, an output of a device which performs module level power electronics (such as micro-inverters and power optimizers) which may be installed in solar panel systems in order to improve performance and safety of the solar panels. The thermal fuse disposed in the connector may be disposed between panels and/or between a single panel or a string of panels and a DC/DC converter or a DC/AC inverter.

The thermal fuse may be disposed in a connector which may then be fitted into cables used in new solar panel installations or retro-fitted into existing solar panel installations.

Figure 12A:
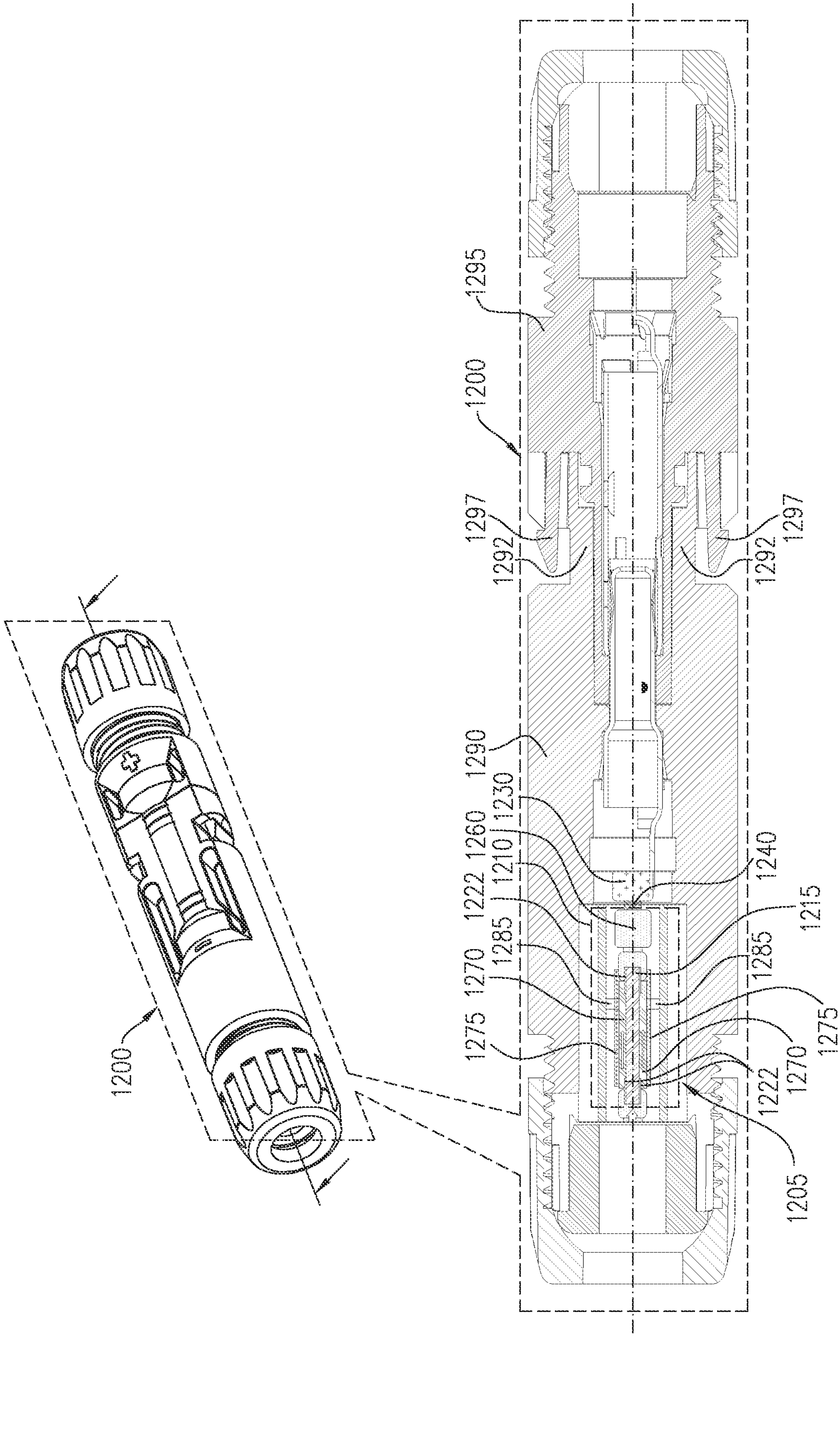
FIG. 12A shows the thermal fuse in a plug portion of the connector, for example, in a photovoltaic energy system.

Reference is now made to FIG. 12A, which shows the thermal fuse assembly in a plug portion 1290, which connected to a socket portion 1295, of the connector 1200, for example, in a photovoltaic energy system. The thermal fuse assembly 1210 may be the same as or similar to the first thermal fuse 170 of FIG. 1, the thermal fuse 400 of FIGS. 4 and 5A-5C, and the thermal fuse assembly 610 of FIG. 6, as well as other thermal fuse assemblies described herein above. The connector plug portion 1290 may be similar to or the same as the connector 100 of FIG. 1, connector 600 of FIG. 6, as well as other connectors described herein above. The connector 1200 comprises two parts, a plug part 1290 which may snap, for example, using connector pins 1292, into a socket part 1295. Connector pins 1292 may connect to corresponding receiving portion 1297 in the socket part 1295.

Figure 12B:
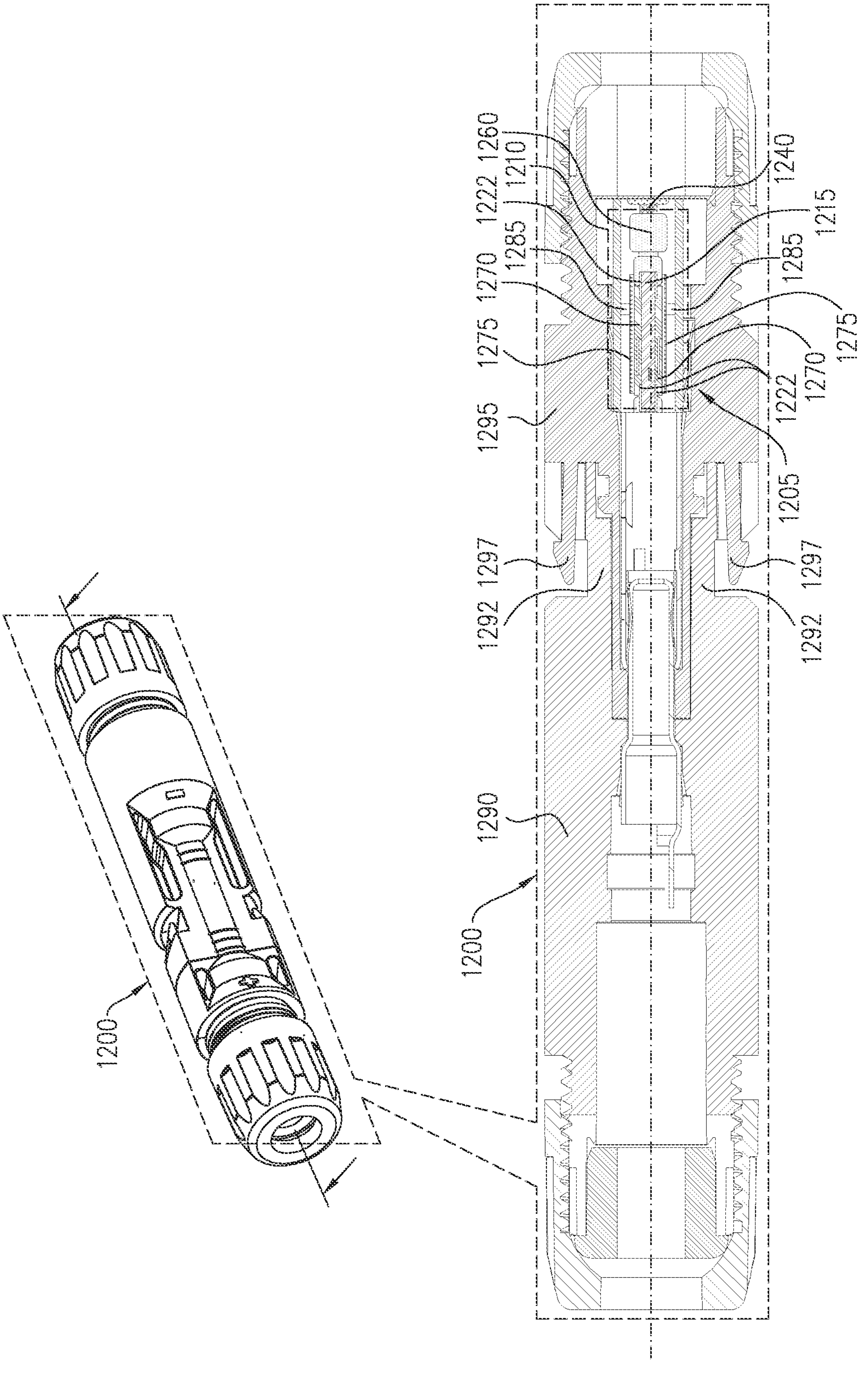
FIG. 12B shows the thermal fuse in a socket portion of the connector, for example, in a photovoltaic energy system.

Reference is now made to FIG. 12B, which shows the thermal fuse assembly 1210 in a socket portion 1295 of the connector 1200, for example, in a photovoltaic energy system. The connector 1200 of FIGS. 12A and 12B may be the same or similar, except for the disposition of the thermal fuse assembly 1210. As noted above, the thermal fuse assembly 1210 may be disposed in the plug portion 1290 of the connector 1200 of FIG. 12A. The thermal fuse 1210 may be disposed in the plug portion 1295 of the connector 1200 of FIG. 12B.

The thermal fuse assembly 1210 may be the same or similar to the thermal fuse assembly 610 described above with reference to FIG. 6. The thermal fuse assembly 1210 may comprise elements which may be the same as or similar to the elements described in the thermal fuse assembly 610 of FIG. 6. By way of example, a length 1240 of conducting material may be the same or similar to the length 640 of conducting material of FIG. 6. A crimp 1260 may be the same or similar to the crimp 660 of FIG. 6; a core 1215 may the same or similar to the core 615 of FIG. 6; a copper layer 1222, may the same or similar to the copper layer 622 of FIG. 6; a conducting portion 1270 may be the same or similar to the conducting portion 670 of FIG. 6; a layer of meltable and/or shrinkable sheath 1275 may be the same as or similar to the layer of shrink wrap 675; and a washer 1285 may be the same as or similar to the washer 685 of FIG. 6. Other elements of the thermal fuse assembly 610 described above with reference to FIG. 6 may not be depicted in FIGS. 12A and 12B, but may be present in an implementation of the connector 1200 described here. The description is meant to be non-limiting.

Figure 12C:
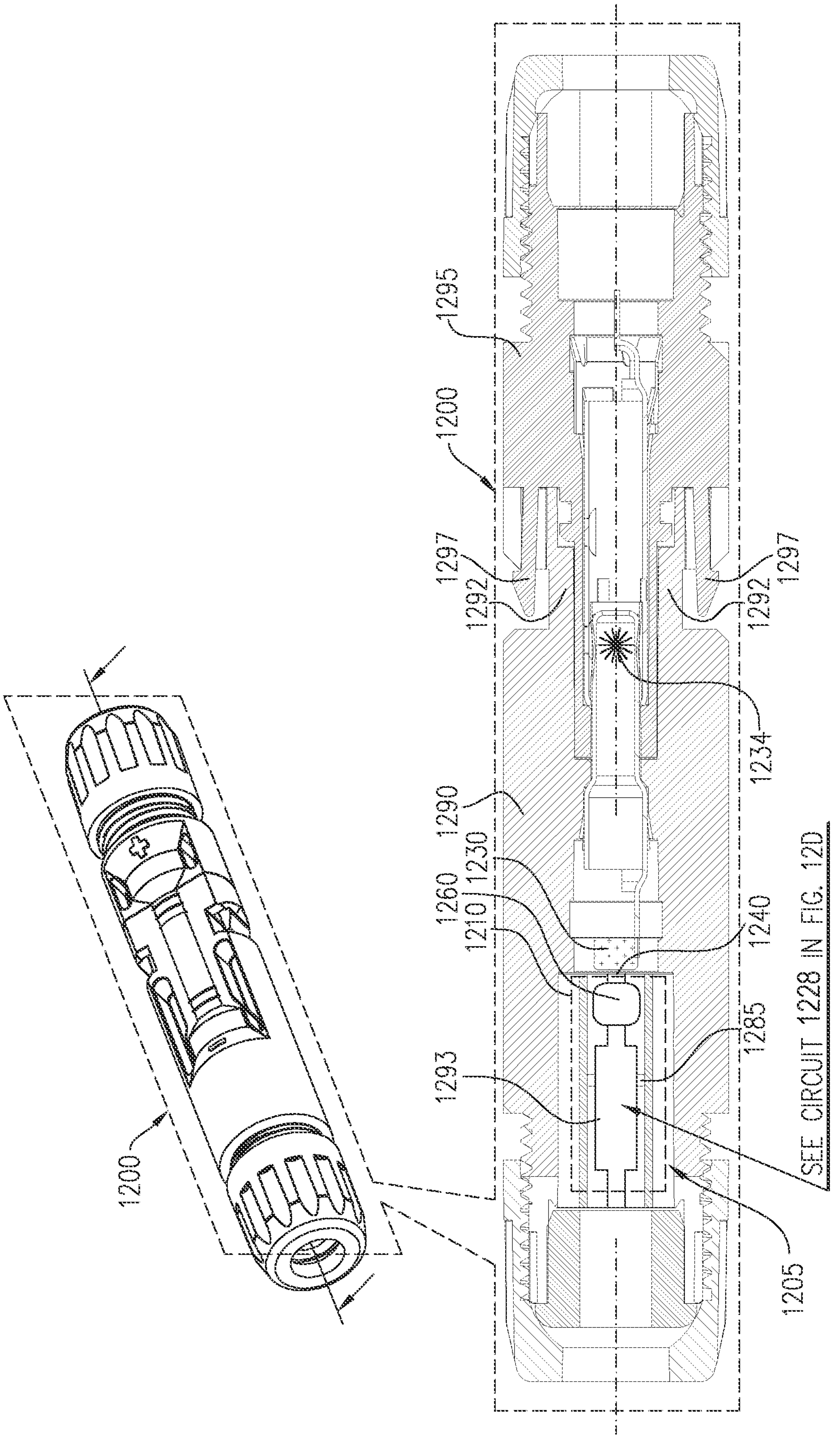
FIG. 12C shows a circuit disposed in the connector and acting as the thermal fuse.

Reference is now made to FIG. 12C, which show a circuit 1293 disposed in the connector and acting as the thermal fuse 1210. For convenience, the circuit 1293 is depicted in the plug portion 1290, similar to the depiction in FIG. 12A. It is appreciated that the circuit 1293 may be disposed in the socket portion 1295, as in FIG. 12B. The washer 1285, the copper layer 1222, the conducting portion 1270, and the shrinkable sheath 1275 may be supplemented by the circuit 1293 which is configured to send a signal (e.g., an alarm) to an external device, such as a server (not depicted) or an inverter (such as inverter 1330, described below, with reference to FIG. 13) if the fuse is broken (e.g., blown). If temperature rises in the connector 1200, for example at a junction between the plug portion 1290 and the socket portion 1295, indicated by a star 1234, for instance, the thermal fuse 1210 may open, and the circuit 1293 may then send a signal to the external device. The circuit 1293 may, for example, generally be disposed in the area where the spring 1036, 1041A, 1041B, 1061A, 1061B, 1071A, 1071B, 1081A, 1081B is disposed, as described above, with reference to FIGS. 10B-10K. It is appreciated that the spring 1036, 1041A, 1041B, 1061A, 1061B, 1071A, 1071B, 1081A, 1081B is featured in the apparatus depicted in FIG. 12C. Other springs may be utilized.

Figure 12D:
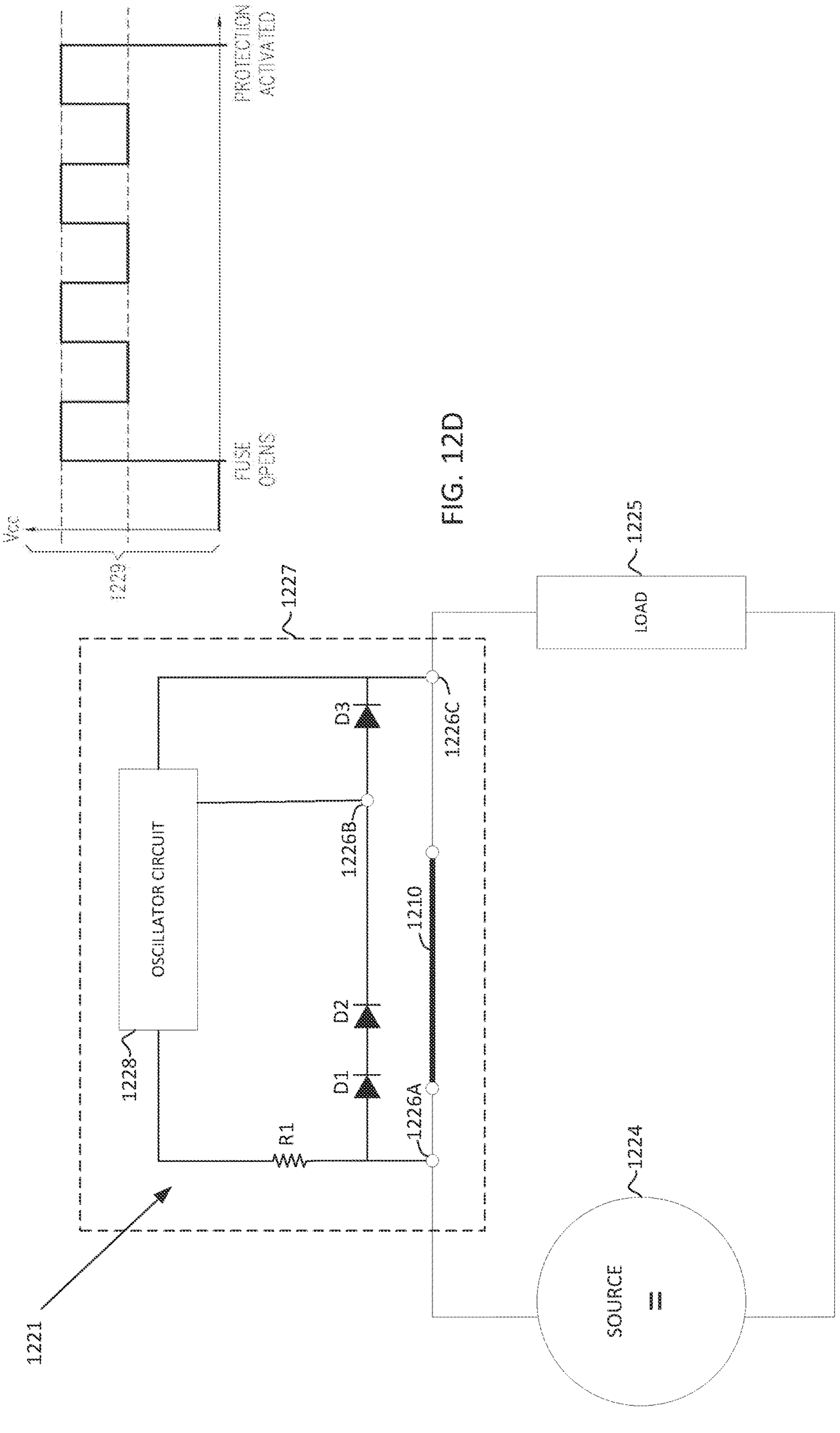
FIG. 12D shows an example of an oscillator circuit which may be disposed in parallel to the thermal fuse.

Reference is now made to FIG. 12D, which shows an example of an alarm circuit 1221 which may comprise an oscillator circuit 1228. The alarm circuit 1221 may be disposed in parallel to the thermal fuse 1210, connecting to the thermal fuse 1210 at nodes 1226A and 1226C, for example. The alarm circuit 1221 may be disposed inside of a connector 1227. The connector 1227 may be the same as or similar to connector 1200 described above, and correspondingly, may be similar to or the same as the connector 100 of FIG. 1, connector 600 of FIG. 6, as well as other connectors described herein above. The connector may be disposed between a source 1224 and a load 1225. By way of example, the source 1224 may be a source of DC electricity, such as, and without limiting the generality of the foregoing, a photovoltaic panel and/or a power optimizer. The load 1225 may comprise, by way of example, a DC/AC inverter, a second power optimizer, or other appropriate power electronic device.

As long as the thermal fuse 1210 remains closed (e.g., not blown), current from the source 1224 flows through the thermal fuse 1210 to the load 1225. When the thermal fuse 1210 is open (e.g., blown), for example, due to the thermal fuse 1210 melting, as described above, current bypasses the now open thermal fuse 1210, and flows into diodes D1 and D2. It is noted that in some implementations, only one diode, for example D1 may be present. Resistor R1 is disposed between node 1226A and the oscillator circuit 1228. Most of the current flows through the diodes D1, D2, and D3 due to the presence of resistor R1. A small amount of current will, however, enter the oscillator circuit 1228 via resistor R1. The oscillator circuit 1228 (described below) may produce an output which oscillates between two values, as depicted by graph 1229. By way of example, if there are two diodes D1 and D2, as depicted, each diode will have a voltage drop of around 600 mV, then the two diodes D1 and D2 will combine to provide a 1200 mV voltage drop. If there is only one diode, D1, then the voltage drop will be around 600 mV.

The oscillator circuit may include a switch disposed between node 1226A and node 1226B. The switch may be controlled to open and close as the oscillator circuit 1228 oscillates, which may be detected as a notification of the open fuse. The switch may comprise a metal oxide semiconductor field-effect transistor (MOSFET), a bipolar junction transistor (BJT), or an insulated-gate bipolar transistor (IGBT) or other appropriate switch. When the switch is open, current flows though the diodes D1 and D2. When the switch is closed, the oscillator circuit 1228 provides a bypass current path via node 1226B. When the switch is open, current bypasses the diodes D1 and D2 and D3, and flows through the oscillator circuit 1228 to node 1226C. The load 1225, e.g., the DC/AC inverter, may detect the oscillation and activate protection. For example the DC/AC inverter may send a command to source 1224 requesting shut down production of DC electricity from the source 1224. The DC/AC inverter may also notify a remote server of the malfunction.

The oscillator circuit 1228 may comprise an oscillator crystal, which may be disposed, for example, on a chipset. For example, the chipset may comprise a 32.768 KHz oscillating crystal. Chipsets comprising crystals which oscillate between 32 KHz-1075.804 MHz may also be used, by way of example, depending on design and implementation. The various frequencies of crystal oscillators mentioned herein are by way of example, and not in a limiting fashion. Other appropriate chipsets at other oscillation frequencies may be used as well.

Figure 12E:
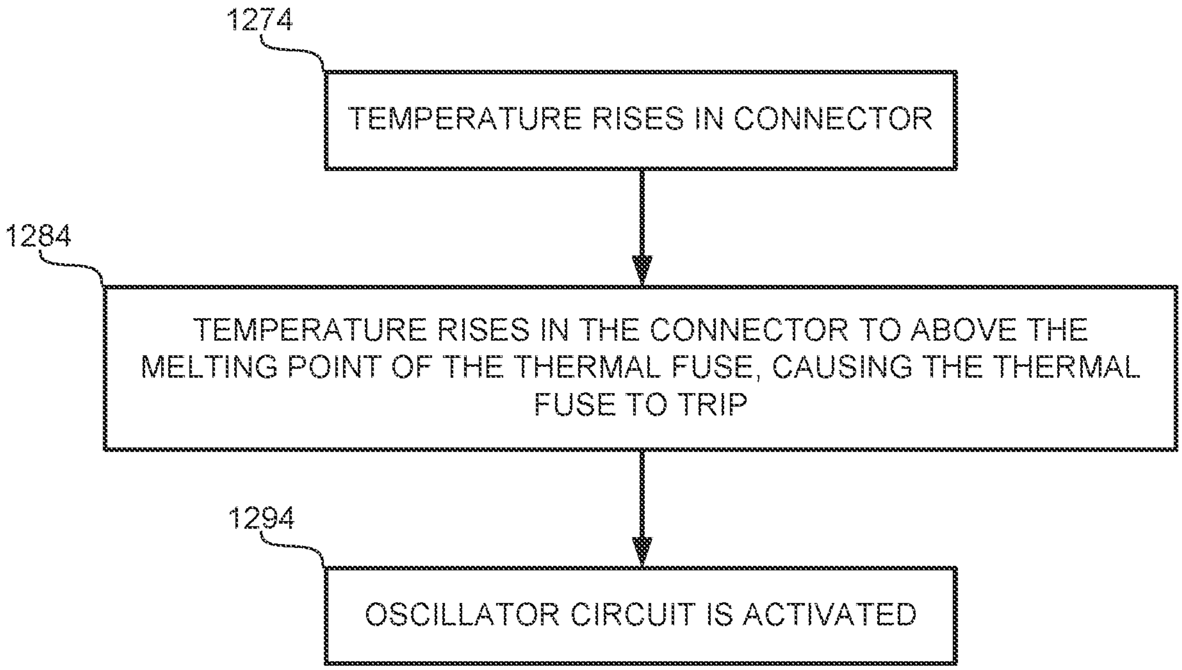
FIG. 12E is a flowchart describing operation of the bypass alarm circuit of FIG. 12 D.

The operation of the bypass alarm circuit 1221 is now described with additional reference to FIG. 12E. At step 1274, the temperature rises in the connector 1200, such as may occur during an arcing event. At step 1284, the temperature rises in the connector 1200 to above the melting point of the thermal fuse 1210, causing the thermal fuse to open, when the low melting metal portion of the fuse melts, thereby breaking a current path through the circuit. The current path into the alarm circuit 1221 has a higher resistance than the current path into the thermal fuse 1210. As long as the thermal fuse 1210 is closed (e.g., not blown), current will flow through the thermal fuse 1210, and not into the oscillator circuit 1228. When the thermal fuse 1210 is blown, the current will flow through the bypass circuit. At step 1294 the bypass circuit is activated. An AC current oscillates at the frequency of the crystal of the oscillator circuit 1228 in the alarm circuit 1221. When the inverter (such as inverter 1330, described below, with reference to FIG. 13) detects the oscillating AC current, the inverter may shut down operation of an effected string of solar panels.

Figure 12F:
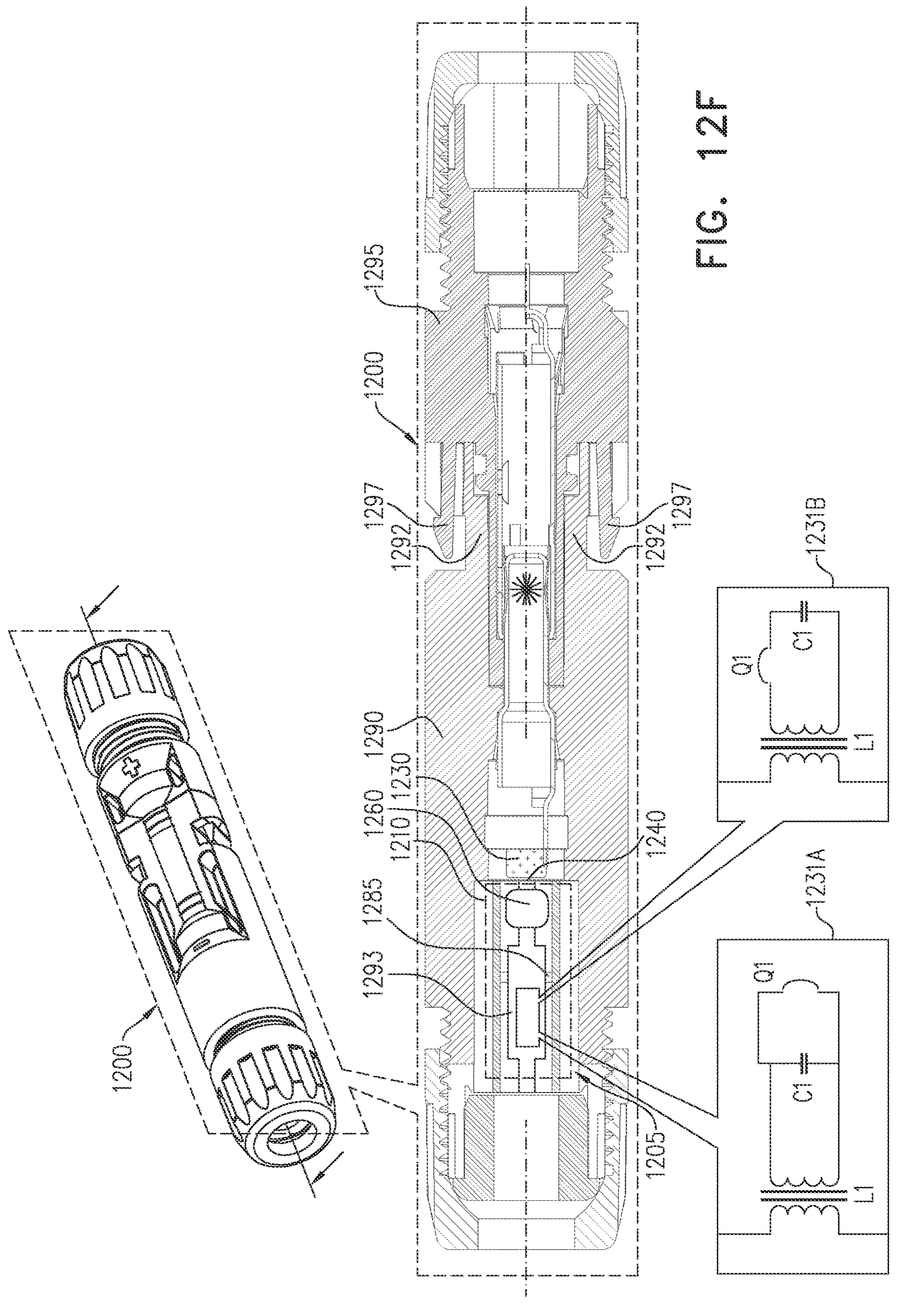
FIG. 12F shows an example of an inductor circuit which may be disposed in parallel to the thermal fuse.

FIG. 12F shows an example of an inductor circuit 1231A, 1231B which may be disposed in parallel to the thermal fuse, instead of the oscillator circuit described above. The inductor circuit 1231A, 1231B may be disposed in the connector in parallel to thermal fuse (depicted here as Q1). Inductor circuit 1231A and inductor circuit 1231B are two non-limiting examples of options for implementing the inductor circuit. When the thermal fuse is closed (unblown), the inductor circuit 1231A, 1231B is shorted. If the thermal fuse opens (is blown), then the inductor circuit 1231, 1231B is no longer shorted.

Inductor circuit 1231A comprises inductor L1 in parallel to a capacitor C1 and the thermal fuse Q1. When the thermal fuse Q1 is blown, the inductor L1 increases impedance, and the capacitor C1 and inductor L1 combine forming a resonant circuit. As the circuit resonates a signal may thereby be created, in accordance with the properties of the resonant circuit. The signal may provide an indication to an inverter, (such as inverter 1330, described below, with reference to FIG. 13) that the thermal fuse 1210 is open. The inverter may then perform steps to shut down operation of affected photovoltaic panels, as well as notify a remote server of the malfunction.

Inductor circuit 1231B may be utilized instead of inductor circuit 1231A. Inductor circuit 1231B comprises the inductor L1 in series with the thermal fuse Q1 and capacitor C1. The thermal fuse Q1 may be disposed between the inductor L1 and the capacitor C1. The capacitor C1 and inductor L1 combine forming a resonant circuit. The inductor L1 may build inductance. A signal created by the resonance of the circuit may indicate to the inverter that the thermal fuse Q1 is not blown. Should the thermal fuse Q1 be blown the resonant circuit is now open, and no signal is provided to the inverter. The inverter may then perform steps to cease operation, such as using a rapid shutdown device or optimizer of the affected photovoltaic panels, as well as notify a remote server of the malfunction.

Figure 12G:
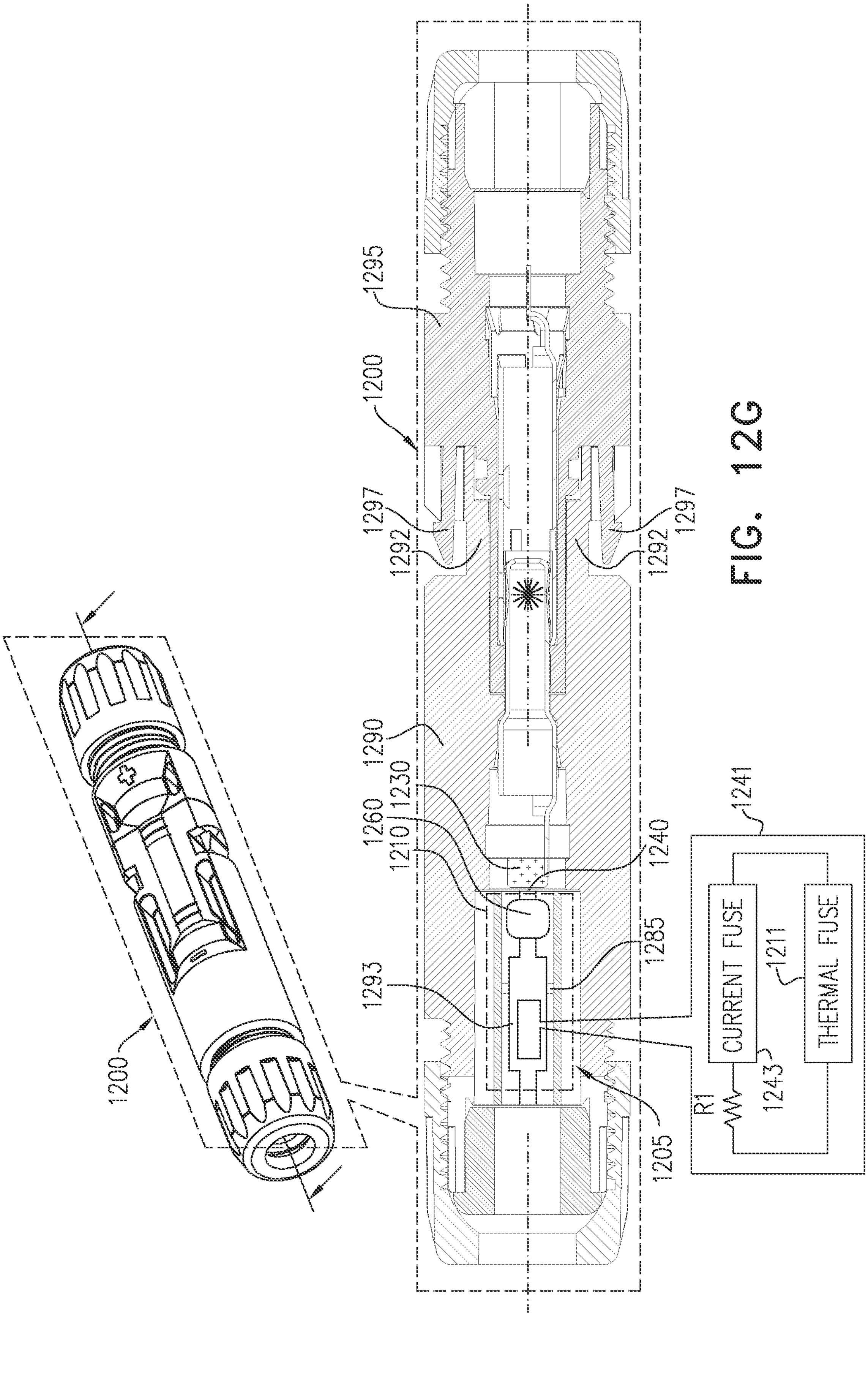
FIG. 12G shows another aspect which may be implemented in the thermal fuse described herein.

Reference is now made to FIG. 12G which shows another aspect 1241 which may be implemented in the thermal fuse described herein. The thermal fuse 1210 may be placed in parallel to a current-limiting fuse. If the thermal fuse melts, a current-limiting fuse 1243 is able to provide a bypass (e.g., to allow a waveform, as described above, to bypass the thermal fuse 1210, to provide an alarm indicating to the inverter (such as inverter 1330, described below, with reference to FIG. 13) that the thermal fuse 1210 is open. The inverter may then perform steps to shut down operation of affected photovoltaic panels, and/or notify a remote server of the malfunction. It is appreciated that variations in the circuitry of FIG. 12G may result in variant wave forms of the signal, such as sine waves or triangular waves instead of the square wave depicted.

Figure 13:
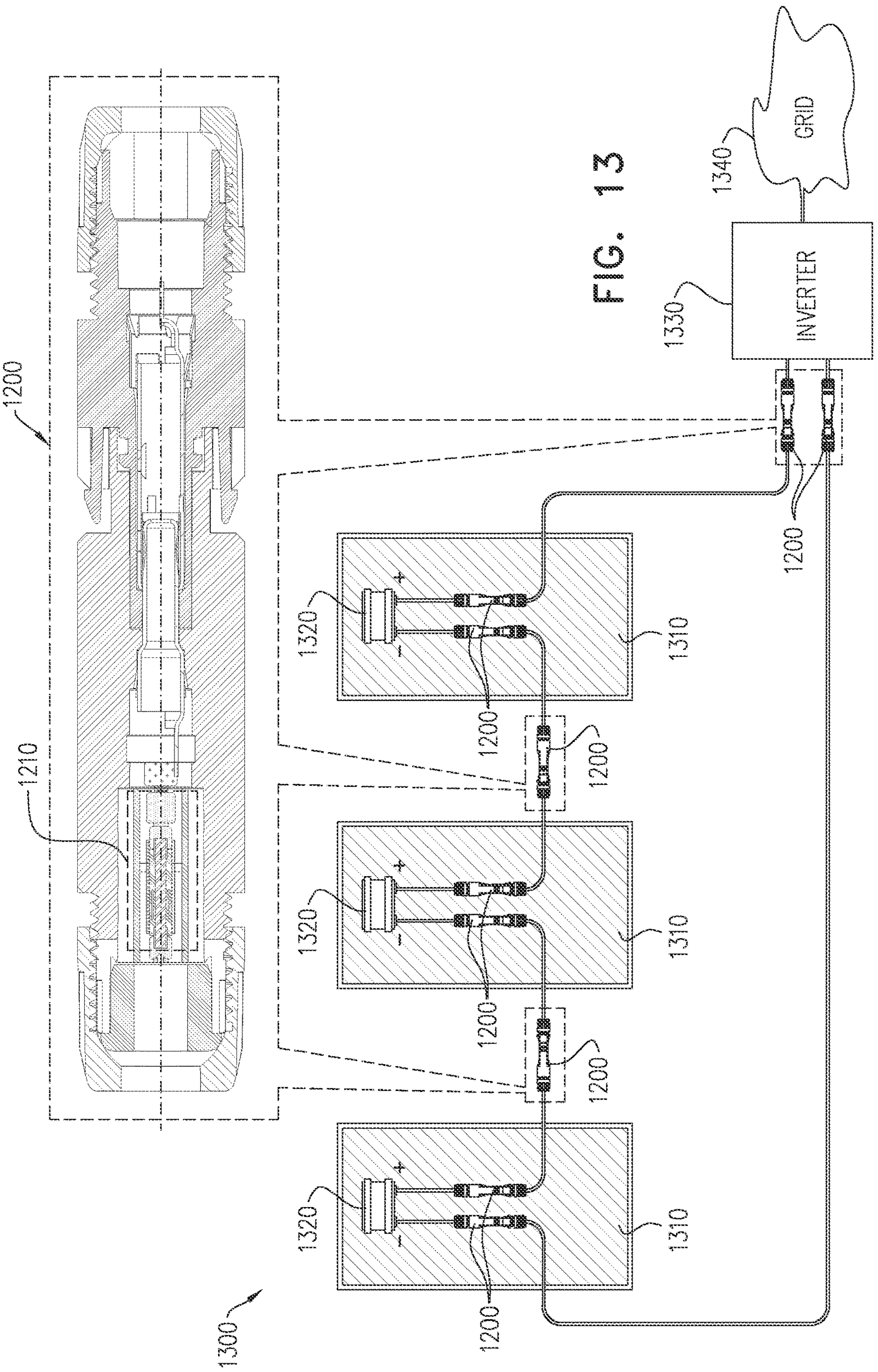
FIG. 13 shows several examples of use of a connector comprising a thermal fuse in a photovoltaic energy system.

FIG. 13 shows several examples of use of the connector 1200 comprising the thermal fuse assembly 1210 in a photovoltaic energy system 1300. The photovoltaic energy system 1300 may comprise at least one solar panel 1310. The at least one solar panel 1310 may have an output interface 1320 from which the at least one solar panel 1310 may output electricity, for example as DC electricity. The output interface 1320 may be an output from a device which performs module level power electronics (such as micro-inverters and power optimizers) which may be installed in the photovoltaic energy system 1300 in order to improve performance of the solar panels 1310. Connections between the output interface 1320 of one of the at least one solar panel 1310 and a second one of the at least one solar panel 1310 may be formed using the connector 1200. A circuit of a series string (by way of example) of a plurality of the at least one solar panel 1310 may connect, via one or more of the connectors 1200 to an inverter 1330, which my, for example, comprise a DC/AC inverter or a DC/DC converter. The inverter 1330 may, by way of example, provide AC electricity to an electric grid 1340. In some implementations, DC electricity may be stored in a battery (not depicted) which may itself be connected to the inverter 1300, a separate DC/DC converter (not depicted), or so forth, with the connector 1200.

The skilled person will appreciate that inventive aspects disclosed herein include an apparatus or a system as in any of the following clauses:

Clauses

Clause 1. An apparatus including a non-conductive base having first and second ends, a first coating including a first conductive substance applied, at least in part, to a surface of the base and extending between the first and the second ends, a second coating including a second conductive substance applied to the first and the second ends and in contact with the first conductive substance, the second conductive substance having a higher melting point than the first conductive substance, and a sheath coating designed to melt or shrink above a given temperature, wherein a rise in temperature to above the given temperature causes the first coating to melt and the sheath to coat the base and insulate an electrical connection through the connector between the first and second ends.

Clause 2. The apparatus of clause 1 wherein the first conductive substance includes copper.

Clause 3. The apparatus of clause 1 or clause 2 wherein the base includes a plastic base.

Clause 4. The apparatus of clause 3 wherein the base includes a non-electrically conductive plastic.

Clause 5. The apparatus of any of clauses 1-4, further including a connector having a wall that encloses the base, the first and the second conductive substances and the sheath, wherein the wall is substantially cylindrical in shape.

Clause 6. The apparatus of clause 5 wherein the base is situated in a window in the connector.

Clause 7. The apparatus of clause 6 wherein the window is stamped in the connector.

Clause 8. The apparatus of either clause 5 or clause 6 and further including a washer disposed in the connector.

Clause 9. The apparatus of clause 8 where the washer substantially fills a space between the sheath and at least one wall of the connector.

Clause 10. The apparatus of any of clauses 5-9 wherein the connector is manufactured by progressive stamping.

Clause 11. The apparatus of any of clauses 1-10 wherein the sheath includes a shrink wrap layer coating the second coating.

Clause 12. The apparatus of clause 5, further including a first terminal connected to the first end and a second terminal connected to the second end, wherein the first terminal and a second terminal are disposed at opposing ends of the connector.

Clause 13. The apparatus of any of clauses 1-12 further including a first terminal connected to the first end and a second terminal connected to the second end, wherein the first terminal and a second terminal are disposed side-by-side.

Clause 14. The apparatus of any of clauses 1-13 wherein the second conductive substance has a lower electrical resistance than the first metallic substance.

Clause 15. An apparatus including a connector including a first wall and a second wall at opposing ends of the connector, a first terminal disposed at a first end of the connector and a second terminal disposed at a second end of the connector, the first terminal and the second terminal disposed between the first wall and the second wall, a conductor disposed between the first terminal and the second terminal, and a sheath surrounding the conductor, the sheath having a contracted state and an uncontracted state, wherein an electrical connection between the first terminal and the second terminal through the conductor is, with the sheath in the uncontracted state, connected between the terminals, and with the sheath in the contracted state, not connected between the terminals, wherein the conductor is disposed in proximity to the first terminal and the second terminal such that the conductor and the first terminal and the second terminals are electrically connected when the sheath is in the in the uncontracted state, and not electrically connected when the sheath is in the contracted state.

Clause 16. The apparatus according to clause 15 wherein the connector includes a crimp.

Clause 17. The apparatus according to clause 16 wherein the crimp is formed by progressive stamping.

Clause 18. The apparatus according to any of clauses 15-18 wherein the connector includes a window.

Clause 19. The apparatus according to clause 16 wherein the window is formed by progressive stamping.

Clause 20. The apparatus according to any of clauses 15-19 wherein the sheath includes a shrinkable layer coating the conductor.

Clause 21. The apparatus according to any of clauses 15-20 wherein the sheath is configured to melt as part of a transition to the contracted state from the uncontracted state.

Clause 22. The apparatus according to any of clauses 15-21 wherein when the sheath is melted, the first terminal and the second terminal are isolated from one another.

Clause 23. The apparatus according to any of clauses 15-22 wherein the conductor has a resistance of less than 4000μΩ.

Clause 24. The apparatus according to any of clauses 15-23 wherein the conductor has a melting point between 50° C.-300° C.

Clause 25. The apparatus according to any of clauses 15-24 wherein the conductor includes a material having a melting point beneath 200° C.

Clause 26. The apparatus according to any of clauses 15-25 wherein the conductor is designed to melt in response to an arc.

Clause 27. The apparatus according to any of clauses 15-26 wherein the connector further includes a silicon washer disposed perpendicularly to the sheath, and blocking the opposing ends from one another.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:

a fusible conductor comprising a first end and a second end, wherein the fusible conductor is configured to, in response to a temperature of the first end or the second end increasing above a first threshold temperature, melt into a liquid; and a sheath surrounding the fusible conductor between the first end and the second end, wherein the sheath is configured to, in response to the temperature of the first end or the second end increasing above a second threshold temperature lower than the first threshold temperature, contract, thereby displacing the liquid.

2. The apparatus of claim 1, wherein the sheath does not extend to at least one of the first end and the second end, thereby providing a path for the liquid to exit from the sheath.

3. The apparatus of claim 1, further comprising a non-conducting core, surrounded by the fusible conductor between the first end and the second end, wherein the non-conducting core provides a rigid base for the fusible conductor, and wherein the sheath, when contracted, is arranged to displace the liquid from between the sheath and the non-conducting core.

4. The apparatus of claim 1, wherein the fusible conductor comprises a metal alloy.

5. The apparatus of claim 1, further comprising low surface contact resistance material attached to the first end and the second end of the fusible conductor.

6. The apparatus of claim 5, wherein the low surface contact resistance material comprises copper.

7. The apparatus of claim 1, wherein, to contract in response to the temperature of the first end or the second end increasing, the sheath is configured to melt.

8. The apparatus of claim 1, wherein, to contract in response to the temperature of the first end or the second end increasing, the sheath is configured to shrink.

9. The apparatus of claim 1, further comprising a connector, wherein the fusible conductor and the sheath are comprised in the connector.

10. The apparatus of claim 1, further comprising a washer and a connector, wherein the washer substantially fills a space between the sheath and at least one wall of the connector.

11. The apparatus of claim 1, further comprising a non-conductive washer and a connector, wherein the non-conductive washer isolates the sheath and the fusible conductor from at least one wall of the connector.

12. The apparatus of claim 1, wherein the fusible conductor has a resistance of less than 4000 μΩ between the first end and the second end.

13. The apparatus of claim 1, wherein the fusible conductor has a melting point temperature between 50° C.-300° C.

14. The apparatus of claim 13, wherein the sheath is configured to contract when above a contraction temperature, the fusible conductor is configured to melt when above the melting point temperature, and the contraction temperature is less than the melting point temperature.

15. The apparatus of claim 14, wherein the contraction temperature is at least 20° C. less than the melting point temperature.

16. The apparatus of claim 1, further comprising an alarm circuit configured to provide a notification based on the displacing of the liquid.

17. The apparatus of claim 16, wherein the alarm circuit is disposed in parallel to a circuit comprising the fusible conductor.

18. The apparatus of claim 16, wherein the alarm circuit comprises an oscillator circuit configured to create an oscillating AC current notification based on the displacing of the liquid.

19. The apparatus of claim 16, wherein the alarm circuit comprises an inductor circuit.

20. The apparatus of claim 1 further comprising a photovoltaic panel or an inverter, wherein the fusible conductor is connected in series with the photovoltaic panel or the inverter.

21. The apparatus of claim 1 further comprising a rapid shutdown device or an optimizer, wherein the fusible conductor is connected in series with the rapid shutdown device or the optimizer.

22. The apparatus of claim 1, wherein the temperature of the fusible conductor is configured to increase above a melting point in response to an over-current condition or an arcing condition of the apparatus.

23. An apparatus comprising:

a housing;

a pin or a socket, at least partially disposed within the housing, and having an exposed end configured to connect and disconnect with a complementary pin or a complementary socket of a second apparatus;

a cable exiting the housing;

a fusible conductor disposed within the housing and comprising a first end electrically connected to the pin or the socket, and a second end electrically connected to the cable, wherein the fusible conductor is configured to melt into a liquid when above a melting point temperature; and a sheath surrounding the fusible conductor between the first end and the second end, wherein the sheath is configured to contract when above a contraction temperature;

wherein in response to heat conducted by the pin or the socket:

the fusible conductor is configured to exceed the melting point temperature and melt into the liquid, and the sheath is configured to exceed the contraction temperature and contract, thereby displacing the liquid.

24. The apparatus of claim 1, further comprising:

a housing;

a pin or a socket, at least partially disposed within the housing, and having an exposed end configured to connect and disconnect with a complementary pin or a complementary socket of a second apparatus;

wherein the fusible conductor and the sheath are disposed within the housing, and wherein the first end of the fusible conductor is electrically connected to the pin or the socket.

* * * * *